(12) United States Patent
Matoba et al.

(10) Patent No.: US 7,425,380 B2
(45) Date of Patent: Sep. 16, 2008

(54) FUEL CELL SYSTEM AND RELATED METHOD

(75) Inventors: Tadashi Matoba, Yokohama (JP); Takeaki Obata, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 648 days.

(21) Appl. No.: 10/508,448

(22) PCT Filed: Oct. 23, 2003

(86) PCT No.: PCT/JP03/13564
§ 371 (c)(1), (2), (4) Date: Sep. 20, 2004

(87) PCT Pub. No.: WO2004/045004
PCT Pub. Date: May 27, 2004

(65) Prior Publication Data
US 2005/0123813 A1   Jun. 9, 2005

(30) Foreign Application Priority Data
Nov. 13, 2002 (JP) ............................. 2002-329978
Aug. 20, 2003 (JP) ............................. 2003-296773

(51) Int. Cl.
*H01M 8/04* (2006.01)
*H01M 8/00* (2006.01)

(52) U.S. Cl. ............................. 429/24; 429/26; 429/13
(58) Field of Classification Search ................... 429/24, 429/26, 13
See application file for complete search history.

(56) References Cited

U.S. PATENT DOCUMENTS

2001/0014414 A1* 8/2001 Okamoto et al. ............... 429/20
2001/0016275 A1* 8/2001 Takamura ..................... 429/20

FOREIGN PATENT DOCUMENTS

| EP | 1 122 805 A2 | 8/2001 |
| EP | 1122805 | * 8/2001 |
| JP | 8-78030 A | 3/1996 |

* cited by examiner

*Primary Examiner*—Patrick Ryan
*Assistant Examiner*—Angela Martin
(74) *Attorney, Agent, or Firm*—Foley & Lardner LLP

(57) ABSTRACT

A fuel cell system and related method are disclosed having a system controller 37 that executes enthalpy calculation based on status signals, related to anode off-gas and cathode off-gas, detected by a temperature detector 29, a pressure detector 30 and a humidity detector 31 for thereby predicting a combustion temperature of a combustor 7 during purging. In the presence of a predicted combustion temperature exceeding an upper limit, cathode off-gas is increased in volume to limit a combustion temperature of the combustor 7 to a value below the upper limit value.

21 Claims, 22 Drawing Sheets

COMBUSTION TEMPERATURE IN NORMAL SEQUENCE

Tmax

COMBUSTION TEMPERATURE Te

AIR FLOW RATE OF AIR SUPPLY UNIT

DISCHARGE RATE OF CATHODE OFF-GAS

SUPPLY RATE OF HYDROGEN

DISCHARGE RATE OF ANODE OFF-GAS

Tp

DISCHARGE START     DISCHARGE STOP     TIME

COMBUSTION TEMPERATURE IN NORMAL SEQUENCE
Tmax
COMBUSTION TEMPERATURE Te

AIR FLOW RATE OF AUXILIARY AIR SUPPLY UNIT

DISCHARGE RATE OF CATHODE OFF-GAS

SUPPLY RATE OF HYDROGEN

DISCHARGE RATE OF ANODE OFF-GAS

Tp

DISCHARGE START
DISCHARGE STOP
TIME

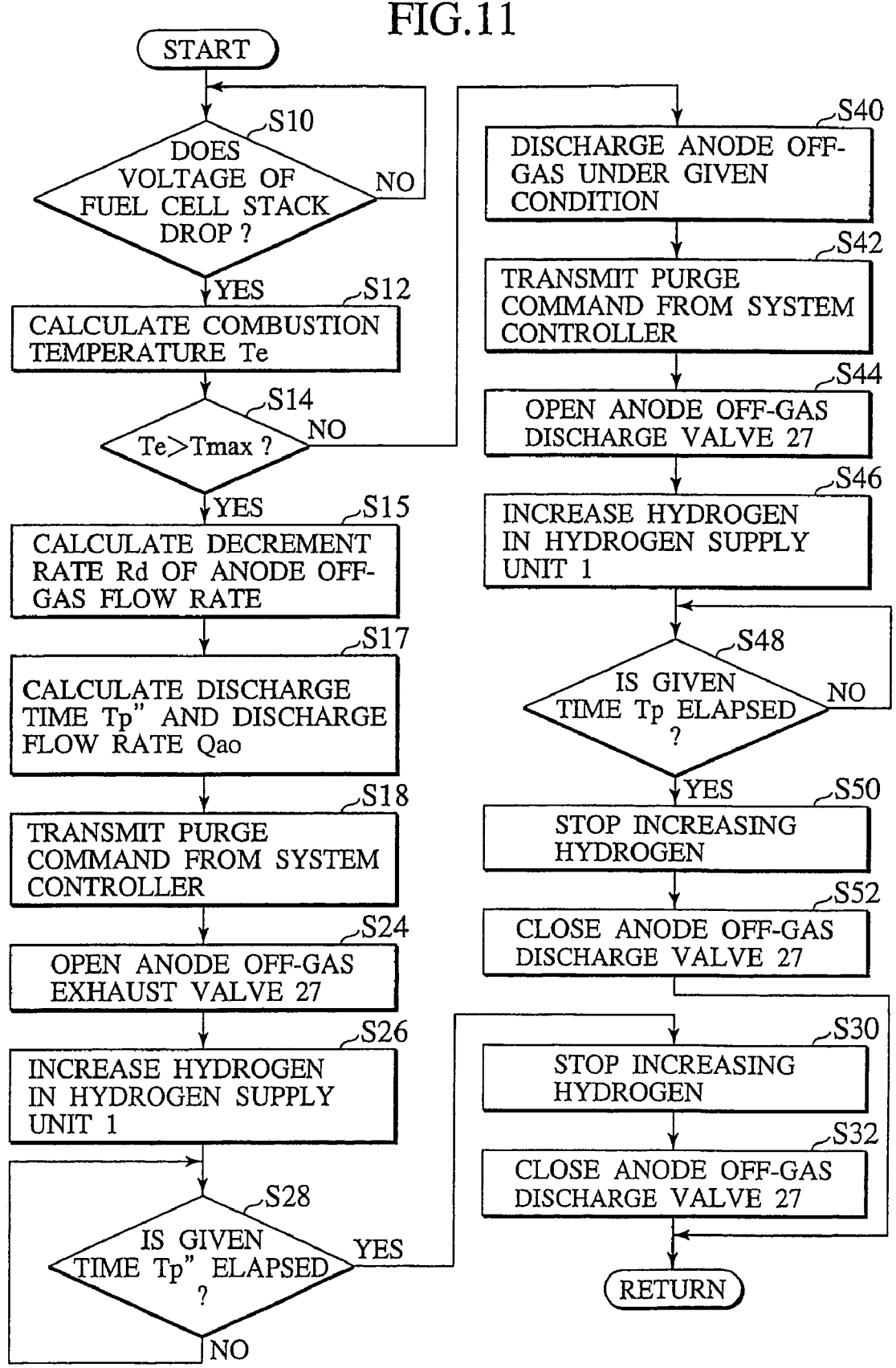

COMBUSTION TEMPERATURE IN NORMAL SEQUENCE
Tmax
COMBUSTION TEMPERATURE Te

AIR FLOW RATE OF AIR SUPPLY UNIT

DISCHARGE RATE OF CATHODE OFF-GAS

SUPPLY RATE OF HYDROGEN

DISCHARGE RATE OF ANODE OFF-GAS $Tp'''$ $Tr'''$

···(REPEAT)

DISCHARGE START
DISCHARGE STOP
TIME

COMBUSTION TEMPERATURE IN NORMAL SEQUENCE

Tmax

COMBUSTION TEMPERATURE Te

SUPPLY RATE OF WATER

DISCHARGE RATE OF CATHODE OFF-GAS

SUPPLY RATE OF HYDROGEN

DISCHARGE RATE OF ANODE OFF-GAS

Tp

TIME

DISCHARGE START

DISCHARGE STOP

AIR FLOW RATE OF
AIR SUPPLY UNIT

DISCHARGE RATE OF
CATHODE OFF-GAS

SUPPLY RATE
OF HYDROGEN

DISCHARGE RATE
OF ANODE OFF-GAS

FIG.19
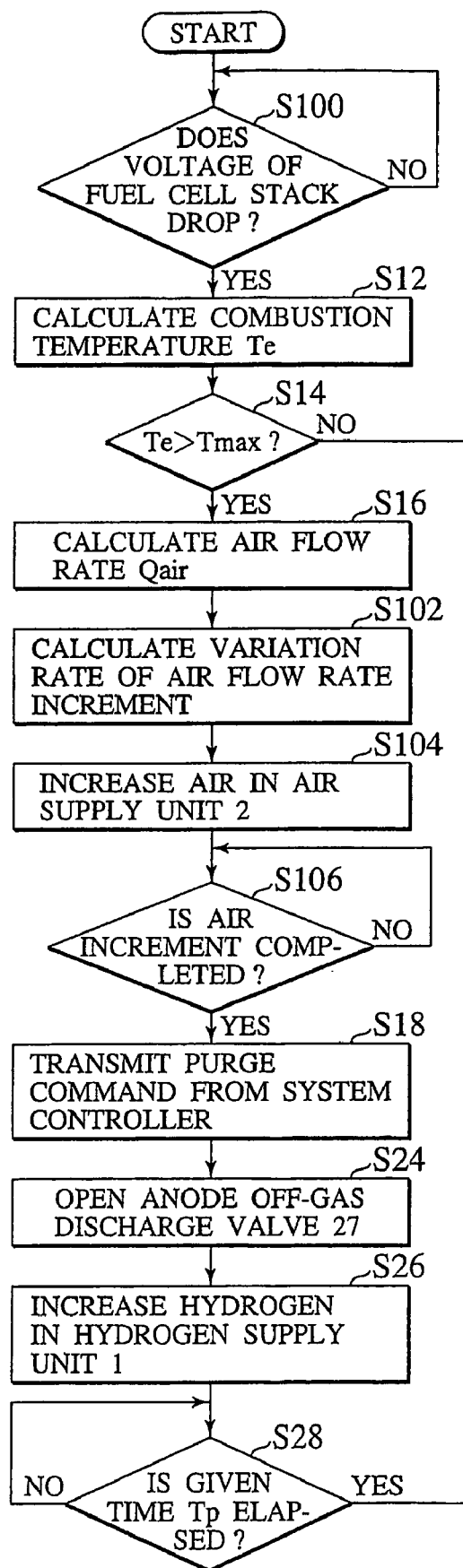
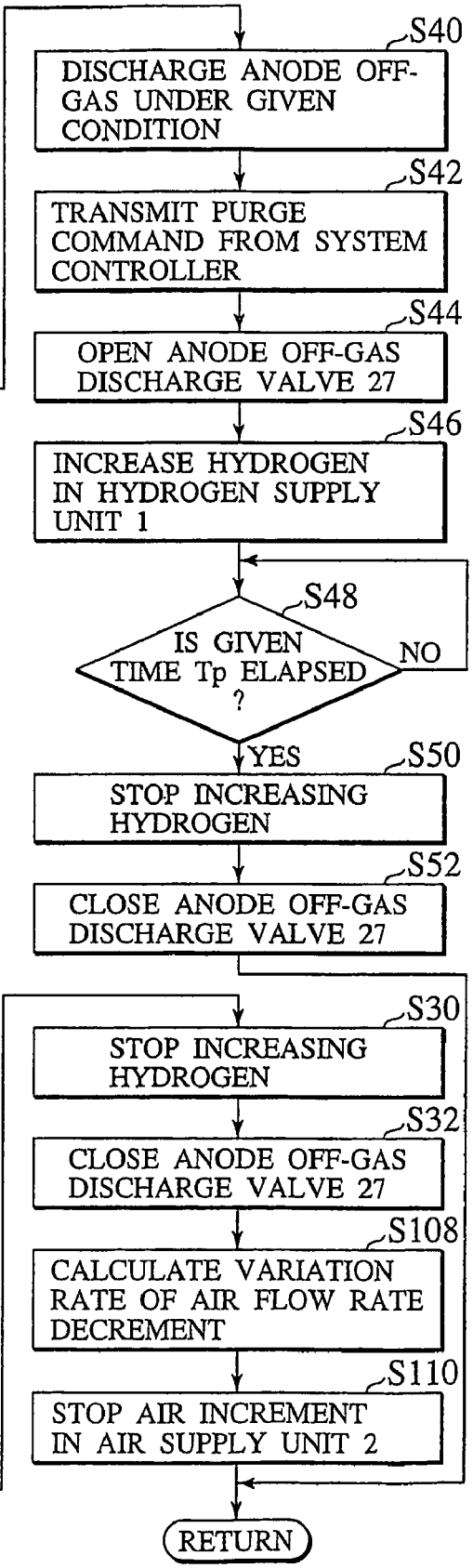

FUEL CELL SYSTEM AND RELATED METHOD

TECHNICAL FIELD

This invention relates to fuel cell systems and, more particularly, to a fuel cell system, that provides improved temperature control of a combustor for combusting anode off-gas, and a related method.

BACKGROUND ART

In a fuel cell system, fuel gas such as hydrogen and oxidant gas containing oxygen electrochemically react with each other via electrolyte to take out an electric energy from electrodes disposed on both sides of the electrolyte. Especially, a solid polymer fuel cell employing a solid electrolyte attracts public attention as an electric power supply for an electric vehicle because of a low operating temperature and ease of handling. A fuel cell powered vehicle is an ultimate clean vehicle with only water remaining as emission matter. This vehicle is installed with a hydrogen absorbing device, such as a high pressure hydrogen tank, a liquid hydrogen tank, and a hydrogen absorbing amorphous alloy tank. Hydrogen supplied from the hydrogen absorbing device and air including oxygen are delivered to the fuel cell to accomplish reaction for taking out the electric energy from the fuel cell to drive a motor connected to drive wheels.

The solid polymer fuel cell includes an anode off-gas recirculation type that anode off-gas containing non-reacted hydrogen gas discharged from an anode outlet is recirculated to the anode inlet. This type fuel cell includes an anode (fuel electrode) inlet supplied with hydrogen at a larger flow rate than that of hydrogen consumed in electrochemical reaction with anode off-gas.

When such an anode off-gas recirculation type fuel cell is continually operated, nitrogen oxide concentration and steam concentration in anode gas increase because air and steam are leaked from a cathode (air electrode). Further, if hydrogen forming fuel gas contains impurities, they accumulate in anode gas without being consumed in electrochemical reaction unlike hydrogen.

These phenomena undesirably degrade an electric power generating performance. Hence, after operation has been continued for a time interval to some extent, anode off-gas containing a large amount of impurities is discharged from the anode off-gas recirculation unit to an external combustor in which combustion takes place between anode off-gas and air.

With such a combustor proposed by Japanese patent Application Laid-Open No. 8-78030, the flow rate of air is controlled such that the temperature of the combustor is controlled not to exceed a heat-resistant temperature.

With this technology, the fuel cell system includes a fuel reformer formed with a combustion chamber into which portions of anode off-gas and cathode off-gas are introduced and combusted; an air compressor driven with a cathode exhaust gas turbine; and a low temperature blower that allows air, together with air delivered from the air compressor, to be drawn into the combustion chamber.

Further, this fuel cell system includes a controller provided for outputting a rotating speed command to the low temperature blower while outputting an opening-degree correction command to a reformer-combustion-air flow-rate regulator valve, based on an output command related to the fuel cell, an oxygen concentration of combustion exhaust gas, and an outlet temperature of the combustor. If the outlet temperature of the combustion chamber exceeds an upper limit, the controller controls the opening degree of the reformer-combustion-air flow-rate regulator valve to be increased and the rotating speed of the low temperature blower to be increased in dependence on the resulting opening degree for increasing the flow rate of air to be supplied to the combustion chamber of the reformer to lower the temperature of the combustion chamber.

DISCLOSURE OF THE INVENTION

However, since the above-described technology has a structure wherein if a detected value of a combustion chamber outlet temperature exceeds a temperature upper limit value, an air flow rate is increased to lower the temperature of the combustion chamber. Therefore, when intermittent and short-term combustion is performed in the combustion chamber, the temperature rise in the outlet gas temperature decreases due to a thermal capacity present in the combustion chamber. Thus, since the combustion temperature exceeding the temperature upper limit value is unable to be detected, as a result performance of the combustion chamber is degraded.

To address such an issue, an aspect of the present invention is a fuel cell system which comprises a fuel gas supply unit supplying fuel gas, an oxidant gas supply unit supplying oxidant gas, a fuel cell stack generating electric power using the fuel gas and the oxidant gas, an anode off-gas recirculation unit recirculating anode off-gas, discharged from an anode of the fuel cell stack, to the anode, a purging unit temporarily discharging the anode off-gas from the anode off-gas recirculation unit to an outside thereof, a combustor combusting at least the anode off-gas, discharged from the purging unit, and the oxidant gas or cathode off-gas discharged from a cathode of the fuel cell stack, and a system controller operative to perform system control such that when permitting the purging unit to discharge the anode off-gas to the combustor, a combustion temperature of the combustor does not exceed a given temperature.

According to another aspect of the present invention, there is provided a method of controlling a fuel cell system, which method comprises preparing a fuel gas supply unit supplying fuel gas, an oxidant gas supply unit supplying oxidant gas, a fuel cell stack generating electric power using the fuel gas and the oxidant gas, a combustor combusting at least anode off-gas, discharged from an anode off-gas and the oxidant gas or cathode off-gas, discharged from a cathode of the fuel cell stack, discharging anode off-gas from the anode of the fuel cell stack, recirculating the anode off-gas, discharged from an air supply unit or the anode of the fuel cell stack, to the anode, combusting at least the anode off-gas, discharged from the anode of the fuel cell stack, and the oxidant gas or cathode off-gas discharged from the cathode of the fuel cell stack, and executing system control such that when permitting the anode off-gas to be discharged to the combustor, a combustion temperature of the combustor does not exceed a given temperature.

Figure 2A:
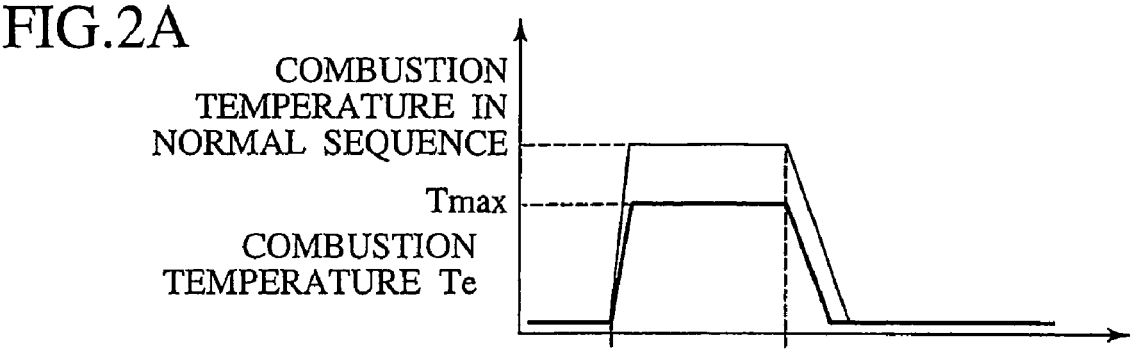
FIGS. 2A to 2E are time charts illustrating combustion temperature control of the first embodiment, with FIG. 2A showing a combustion temperature Te of a combustor 7, FIG. 2B showing a flow rate of air supplied from an air supply unit 2, FIG. 2C showing a discharge rate of cathode off-gas, FIG.
Figure 2B:
Figure 2C:
Figure 2D:
Figure 2E:
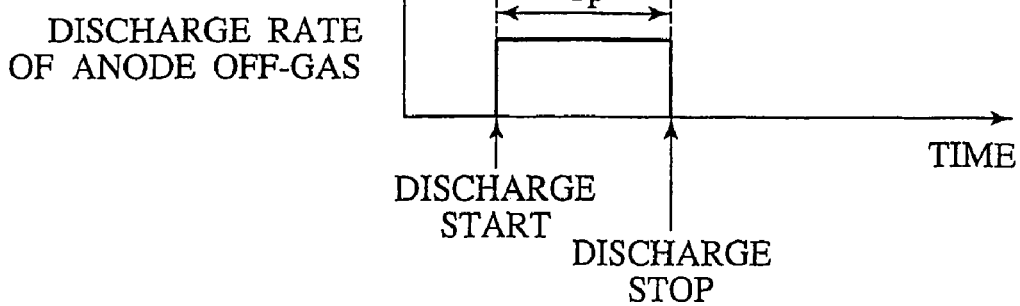

2D showing a flow rate of hydrogen supplied from a hydrogen supply unit 1 and FIG. 2E showing a discharge rate of anode off-gas.

Figure 3:
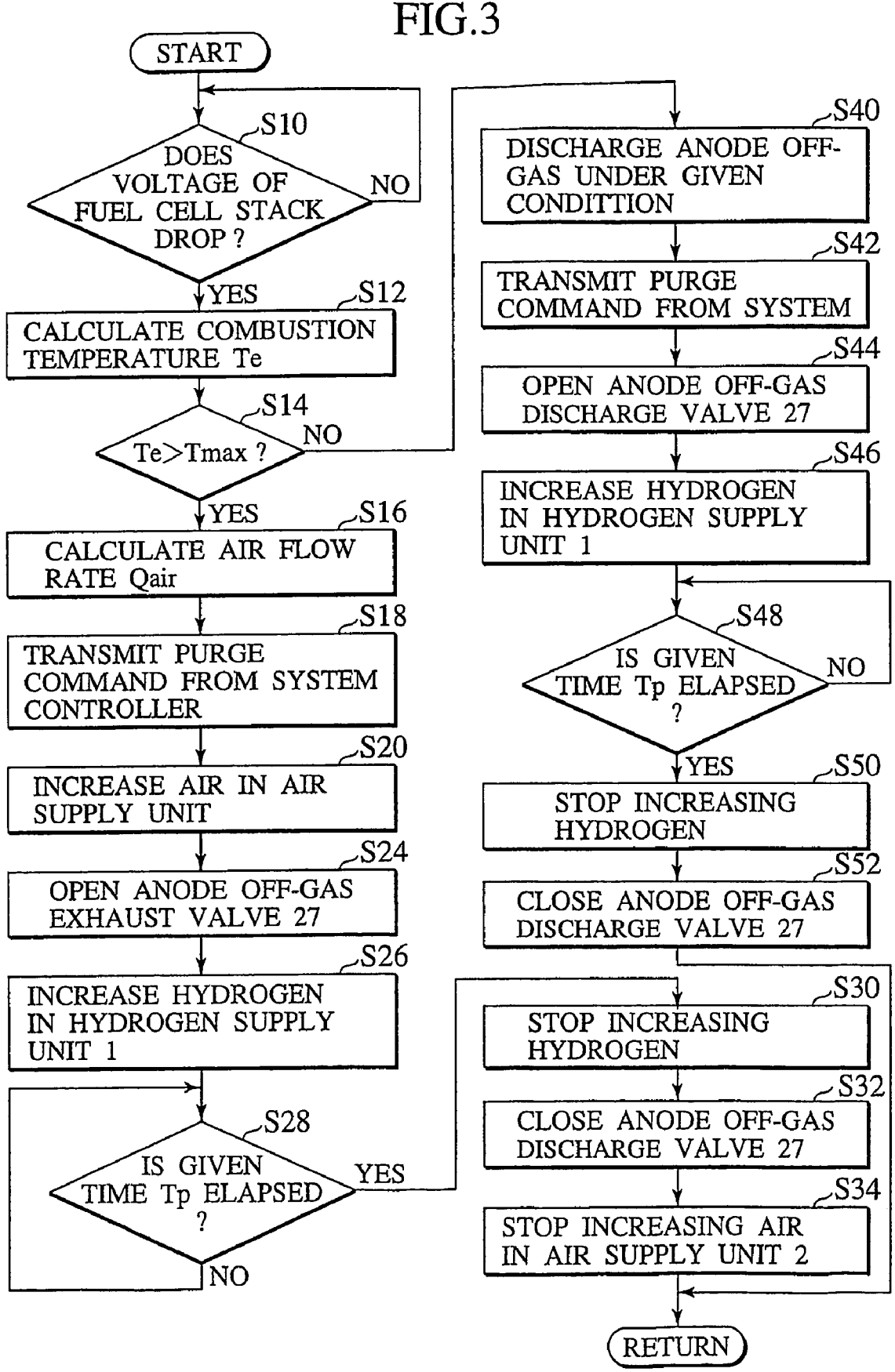

FIG. 3 is a flowchart illustrating a control content of a system controller forming part of the first embodiment.

Figure 4:
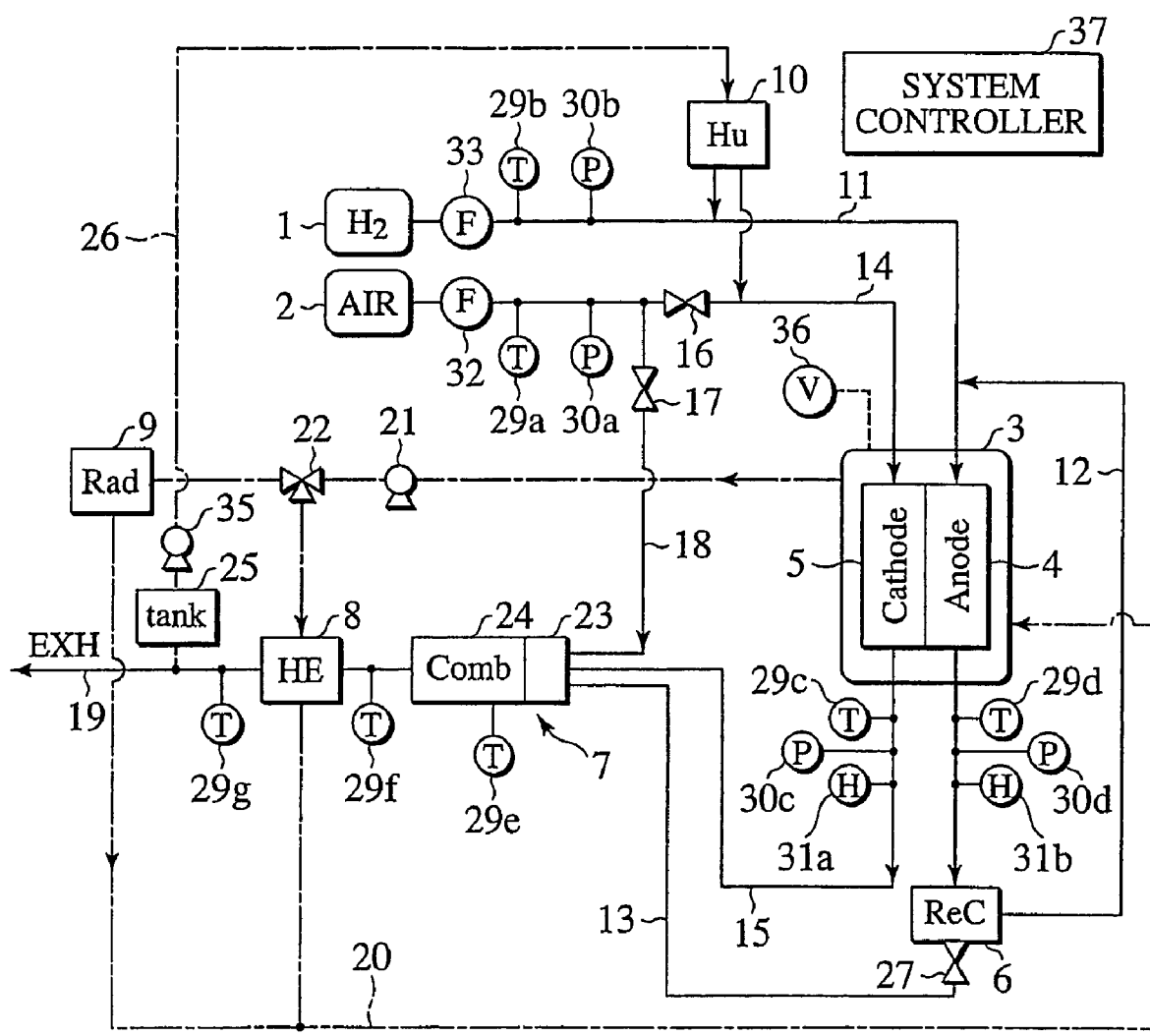

FIG. 4 is a system structural view illustrating a structure of a second embodiment of a fuel cell system according to the present invention.

Figure 5A:
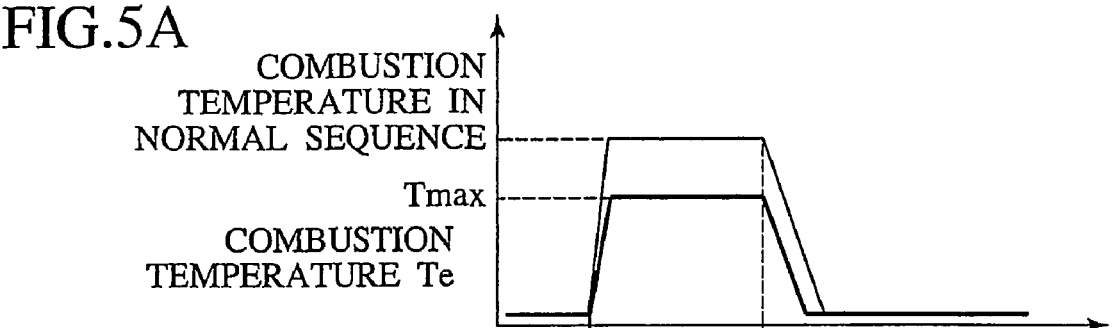
Figure 5B:
Figure 5C:
Figure 5D:
Figure 5E:
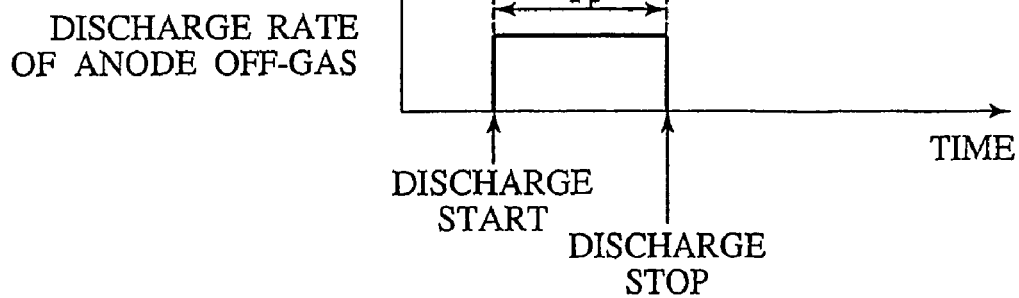

FIGS. 5A to 5E are time charts illustrating combustion temperature control of the second embodiment, with FIG. 5A showing the combustion temperature Te of the combustor 7, FIG. 5B showing the flow rate of air supplied from the air supply unit 2, FIG. 5C showing the discharge rate of cathode off-gas, FIG. 5D showing the flow rate of hydrogen supplied from the hydrogen supply unit 1 and FIG. 5E showing the discharge rate of anode off-gas.

Figure 6:
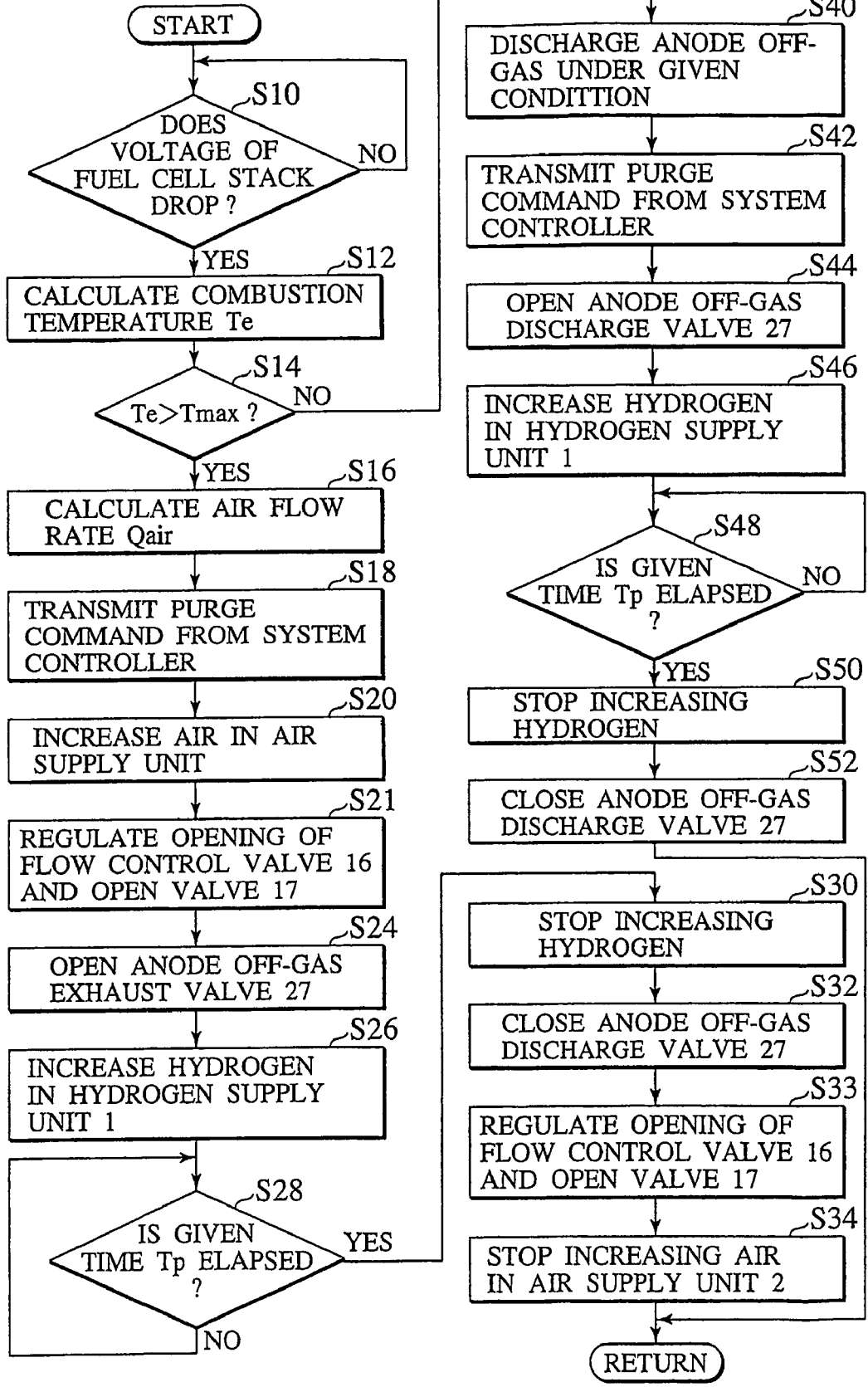

FIG. 6 is a flowchart illustrating a control content of a system controller forming part of the second embodiment.

Figure 7:
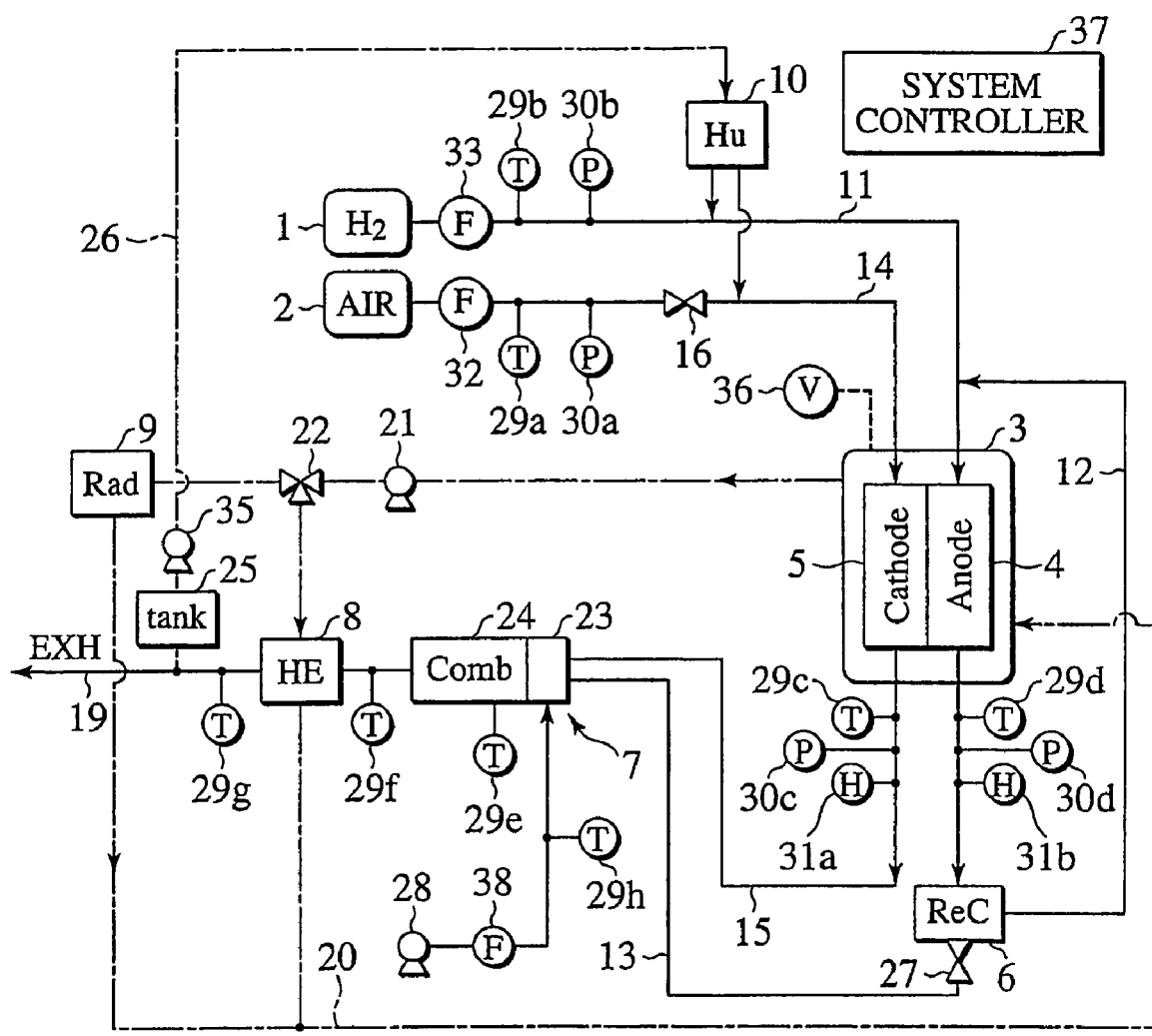

FIG. 7 is a system structural view illustrating a structure of a third embodiment of a fuel cell system according to the present invention.

Figure 8A:
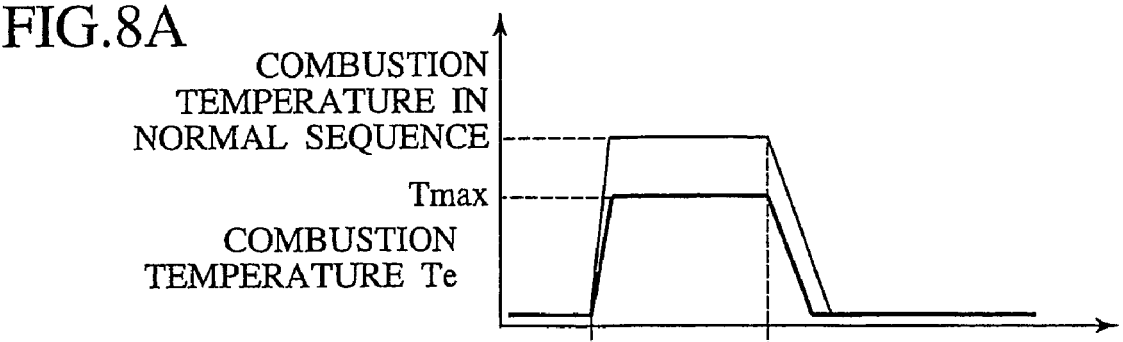
Figure 8B:
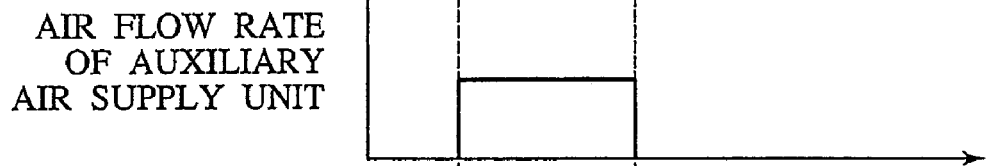
Figure 8C:
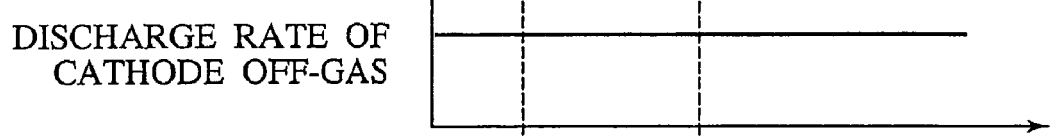
Figure 8D:
Figure 8E:
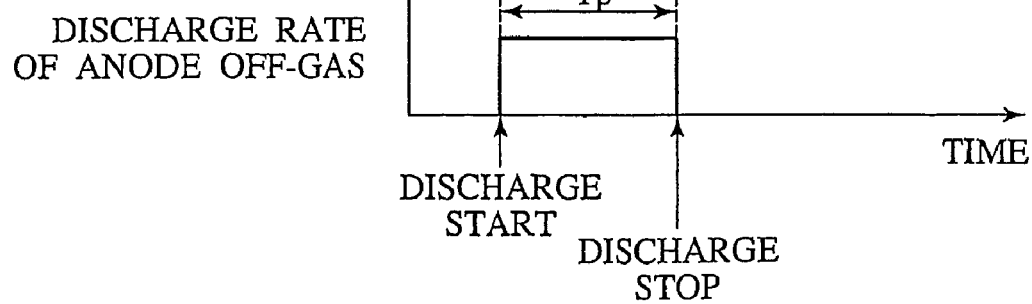

FIGS. 8A to 8E are time charts illustrating combustion temperature control of the third embodiment, with FIG. 8A showing the combustion temperature Te of the combustor 7, FIG. 8B showing the flow rate of air supplied from an auxiliary air supply unit 28, FIG. 8C showing the discharge rate of cathode off-gas, FIG. 8D showing the flow rate of hydrogen supplied from the hydrogen supply unit 1 and FIG. 8E showing the discharge rate of anode off-gas.

Figure 9:
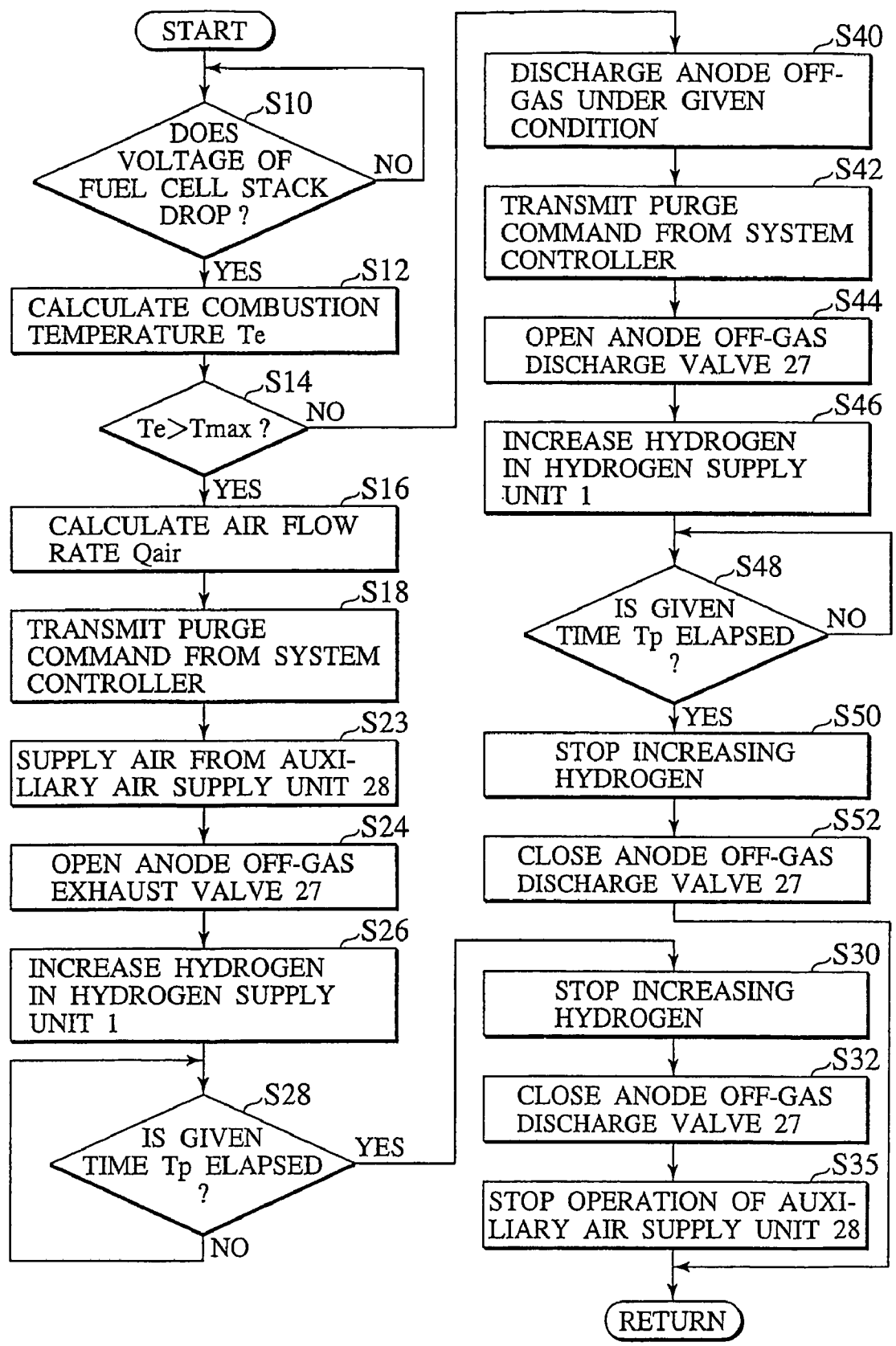

FIG. 9 is a flowchart illustrating a control content of a system controller forming part of the third embodiment.

Figure 10A:
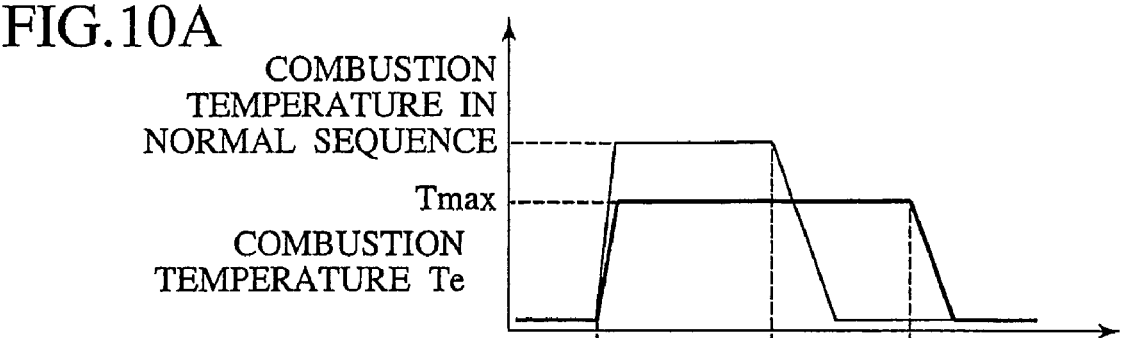
Figure 10B:
Figure 10C:
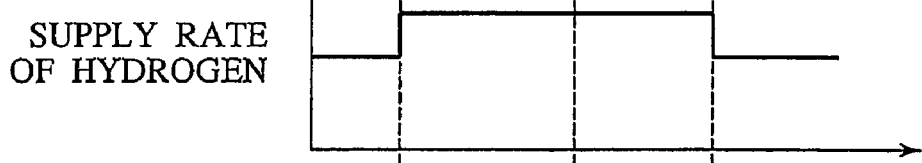
Figure 10D:
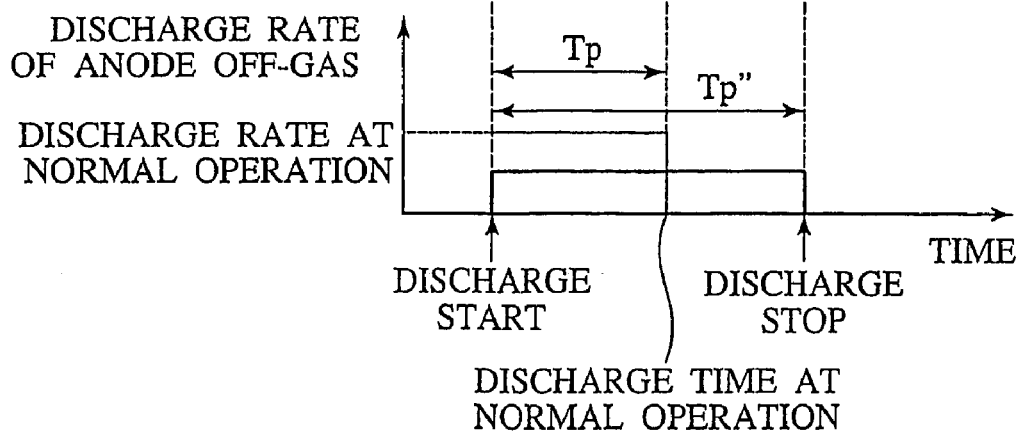

FIGS. 10A to 10D are time charts illustrating combustion temperature control of a fourth embodiment, with FIG. 10A showing the combustion temperature Te of the combustor 7, FIG. 10B showing the discharge rate of cathode off-gas, FIG. 10C showing the flow rate of hydrogen supplied from the hydrogen supply unit 1 and FIG. 10D showing the discharge rate of anode off-gas.

FIG. 11 is a flowchart illustrating a control content of a system controller forming part of a fourth embodiment.

Figure 12A:
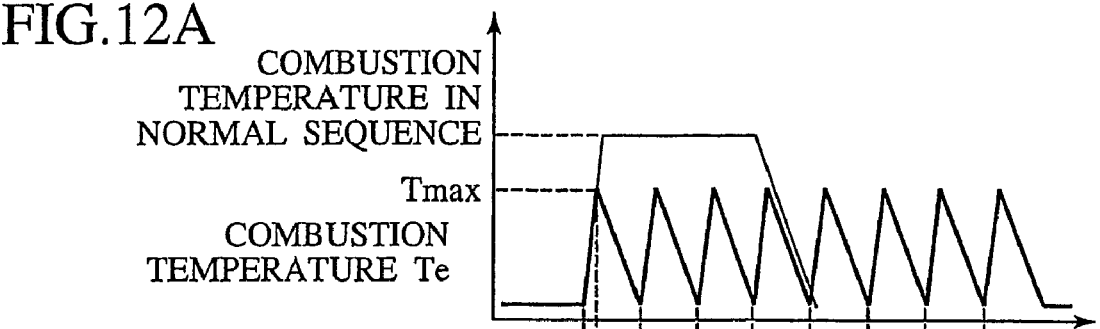
Figure 12B:
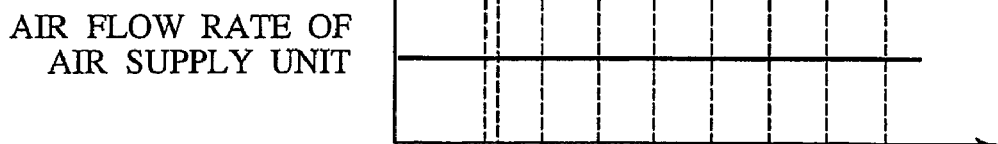
Figure 12C:
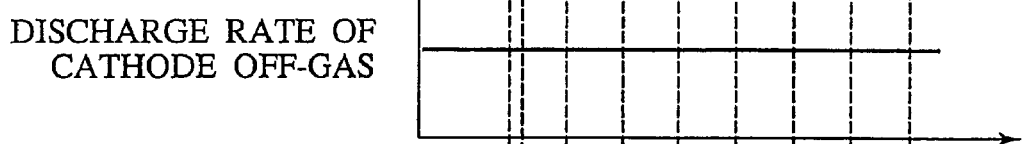
Figure 12D:
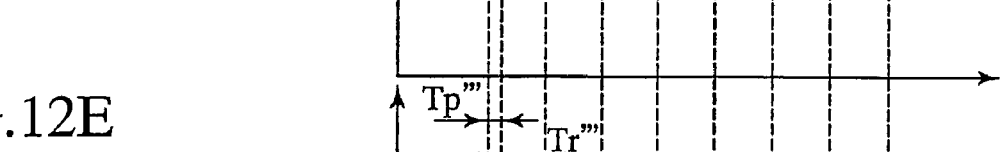
Figure 12E:
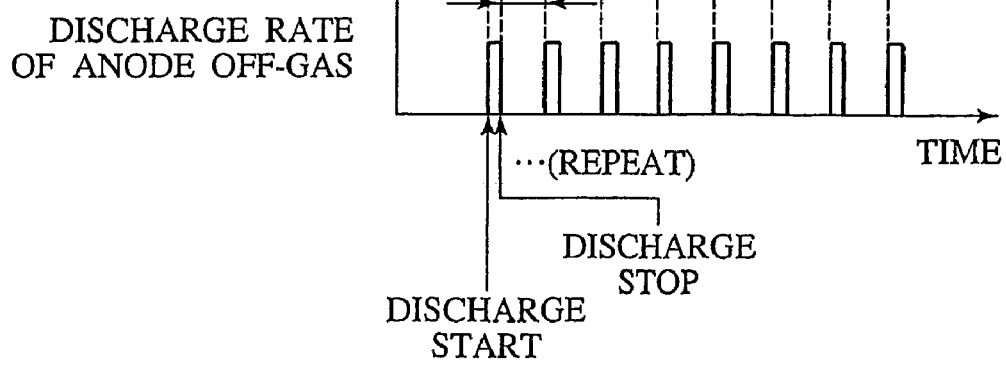

FIGS. 12A to 12E are time charts illustrating combustion temperature control of a fifth embodiment, with FIG. 12A showing the combustion temperature Te of the combustor 7, FIG. 12B showing the flow rate of air supplied from the air supply unit 2, FIG. 12C showing the discharge rate of cathode off-gas, FIG. 12D showing the flow rate of hydrogen supplied from the hydrogen supply unit 1 and FIG. 12E showing the discharge rate of anode off-gas.

Figure 13:
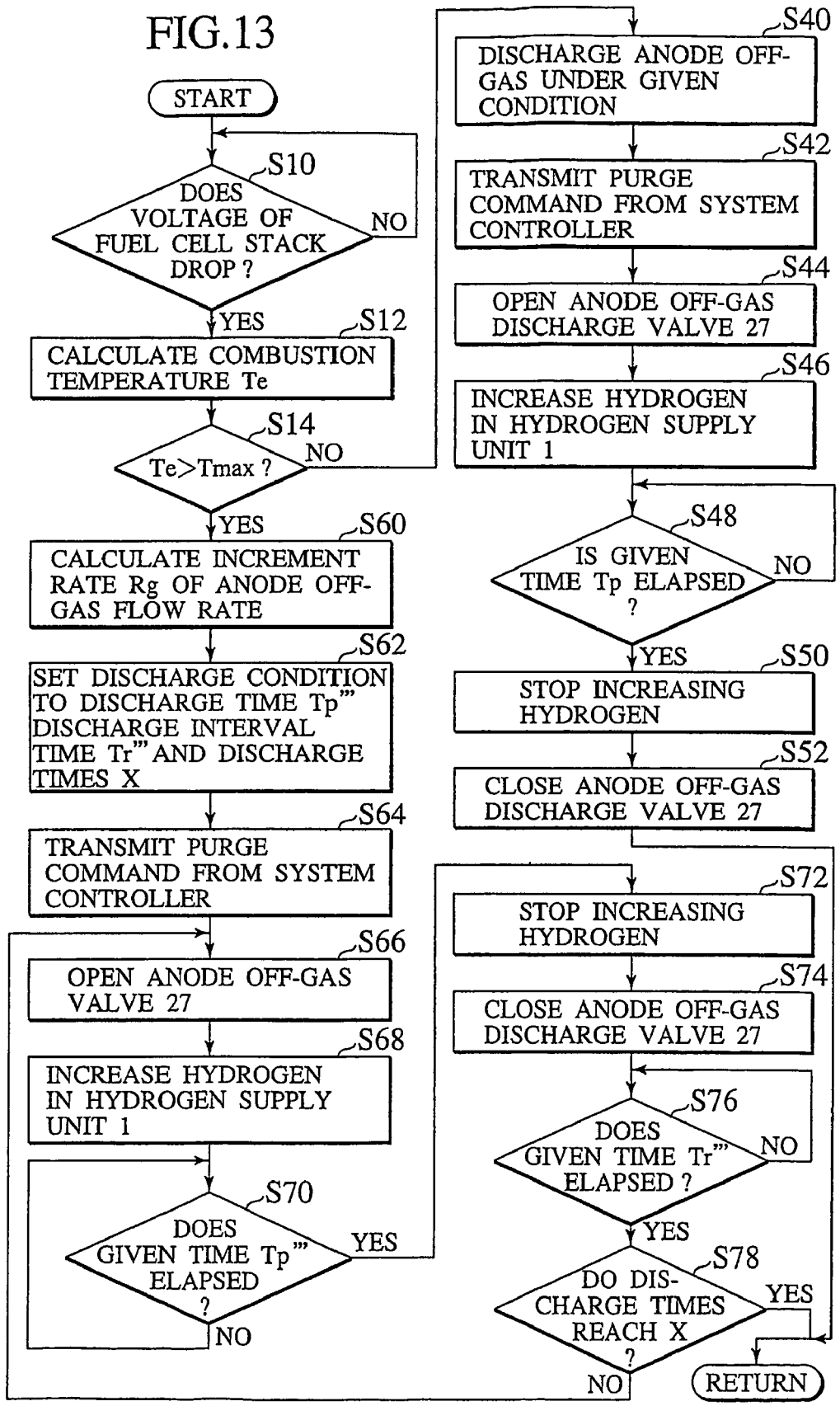

FIG. 13 is a flowchart illustrating a control content of a system controller forming part of a fifth embodiment.

Figure 14:
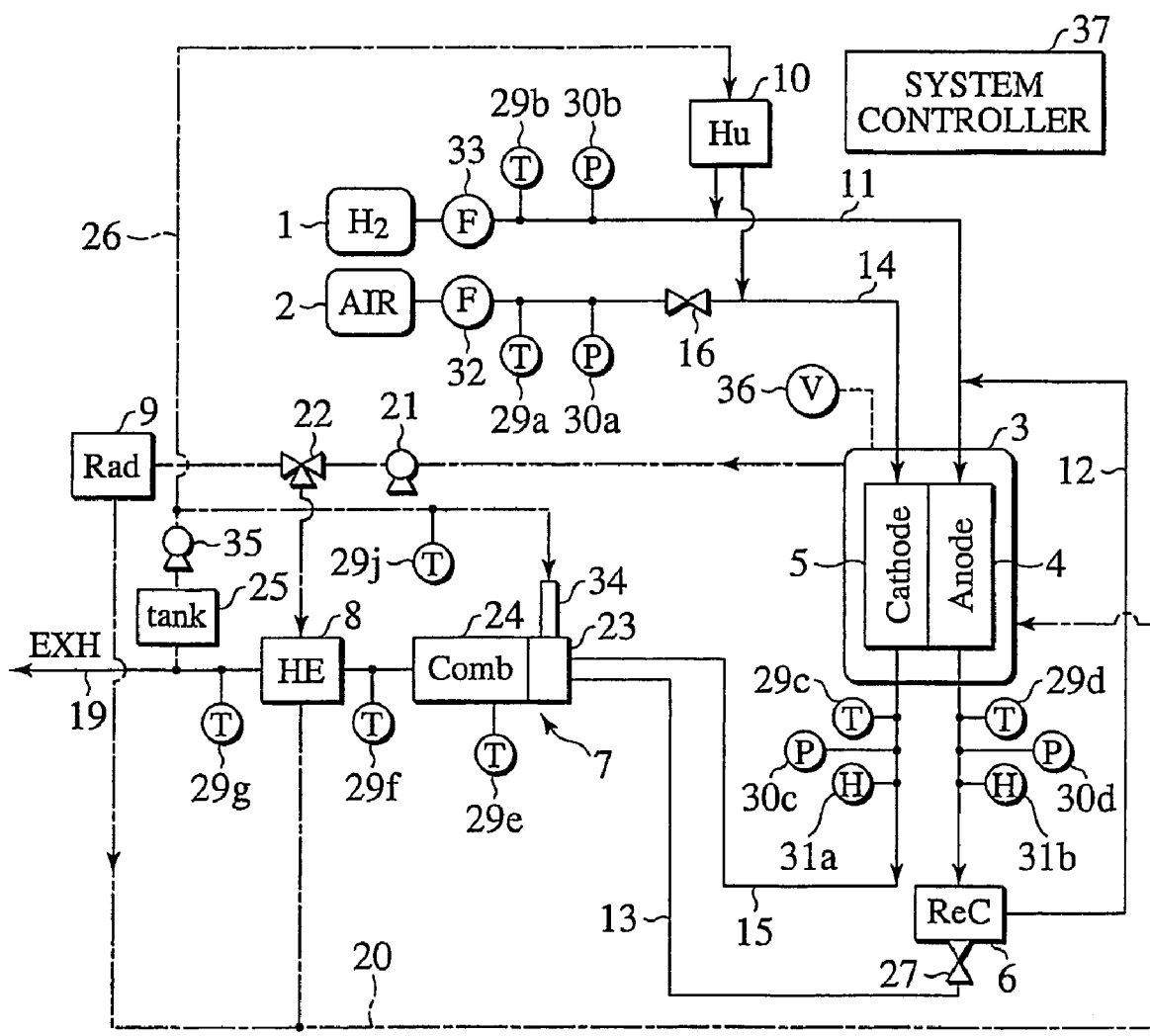

FIG. 14 is a system structural view illustrating a structure of a sixth embodiment of a fuel cell system according to the present invention.

Figure 15A:
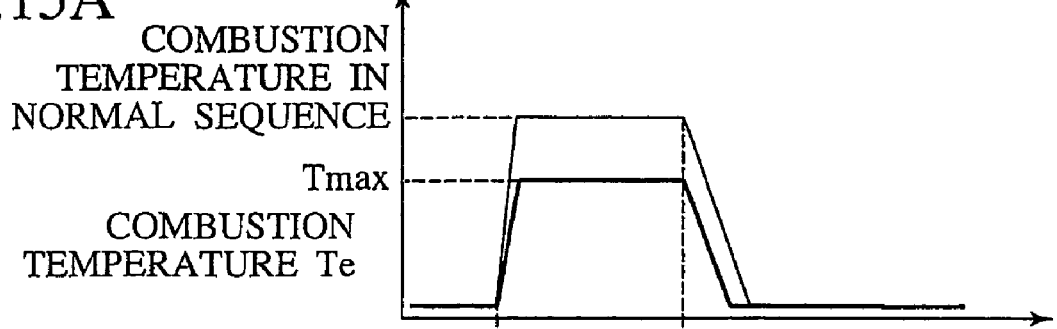
Figure 15B:
Figure 15C:
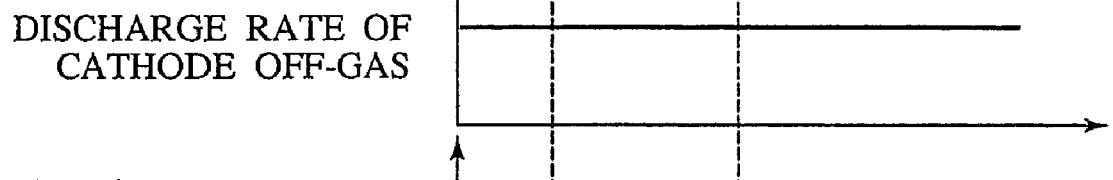
Figure 15D:
Figure 15E:
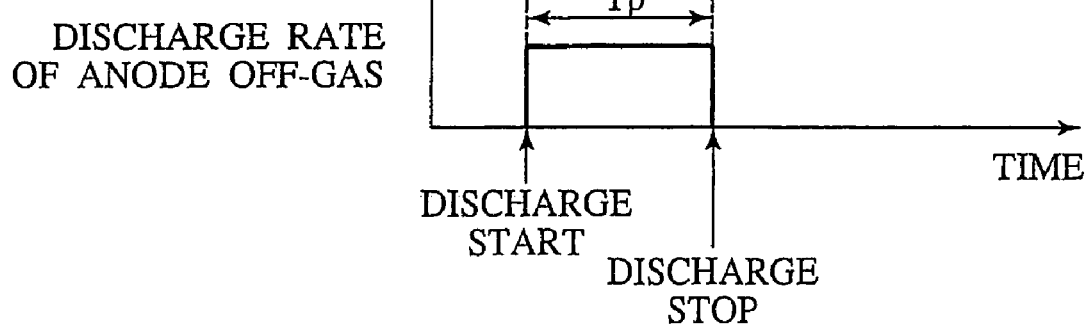

FIGS. 15A to 15E are time charts illustrating combustion temperature control of the sixth embodiment, with FIG. 15A showing the combustion temperature Te of the combustor 7, FIG. 15B showing the supply rate of water, FIG. 15C showing the discharge rate of cathode off-gas, FIG. 15D showing the supply rate of hydrogen supplied from the hydrogen supply unit 1 and FIG. 15E showing the discharge rate of anode off-gas.

Figure 16:
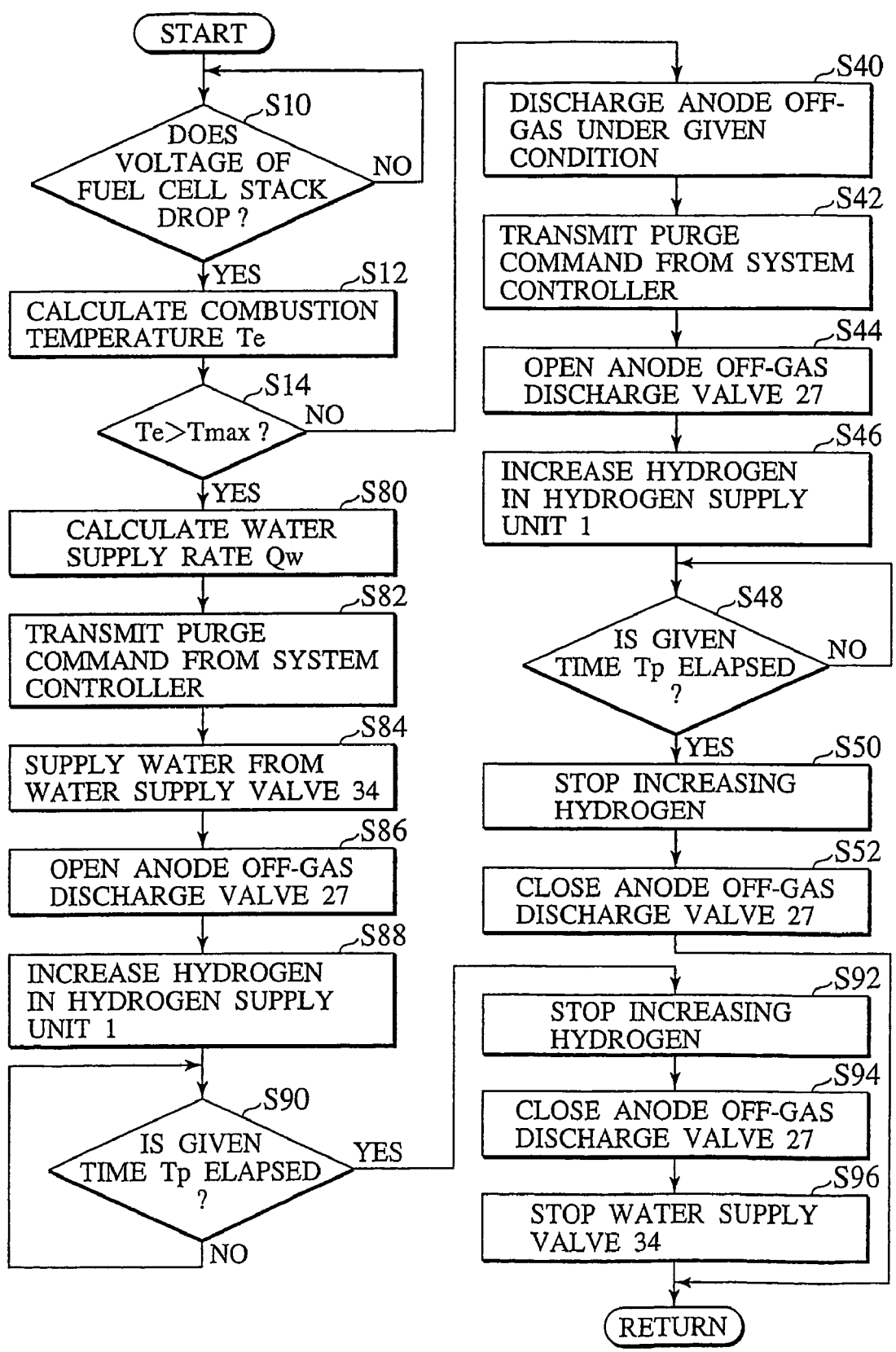

FIG. 16 is a flowchart illustrating a control content of a system controller forming part of the sixth embodiment.

Figure 17:
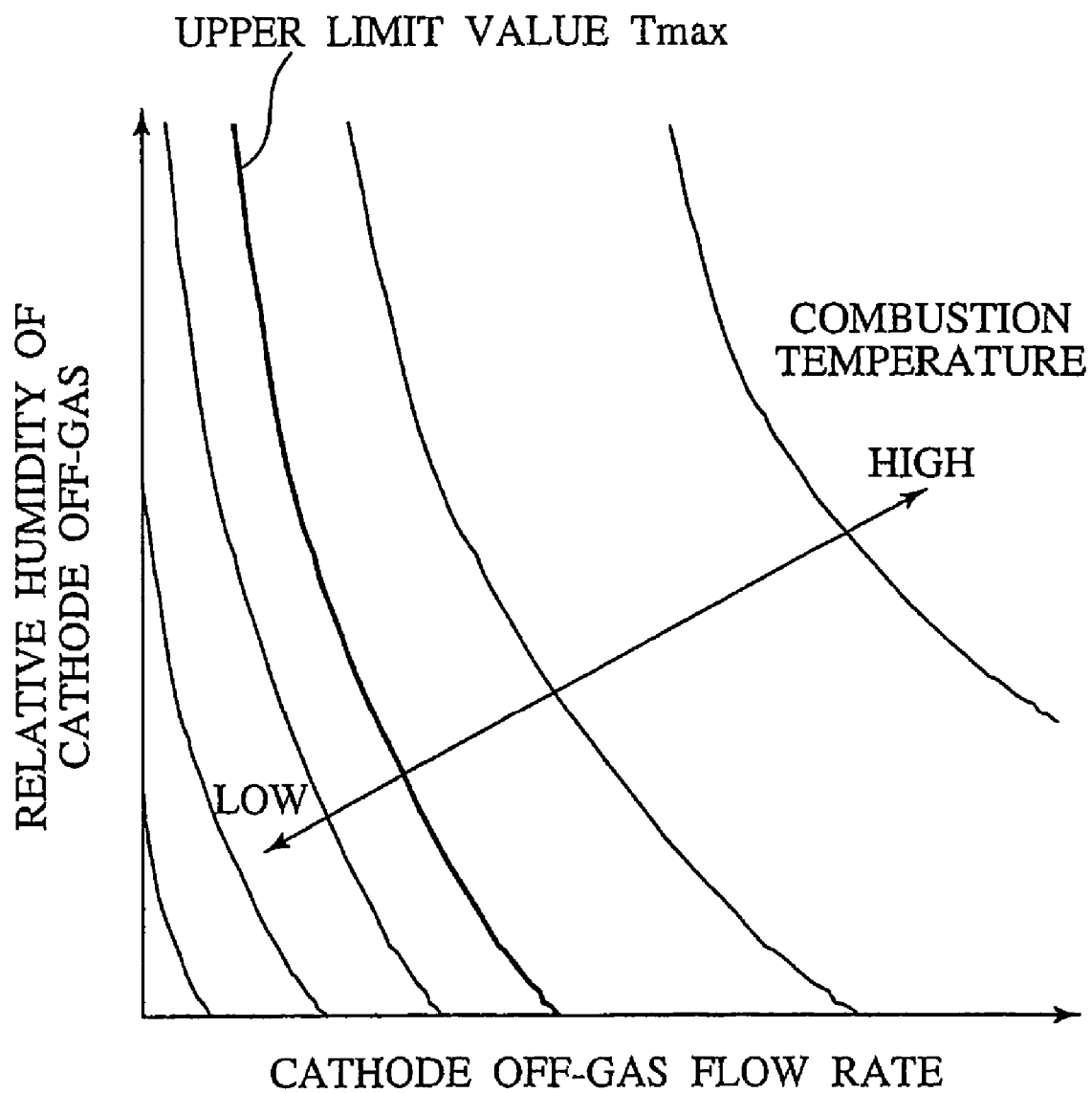

FIG. 17 is a view illustrating an example of a combustion temperature prediction map in terms of an operating condition of a fuel cell.

Figure 18A:
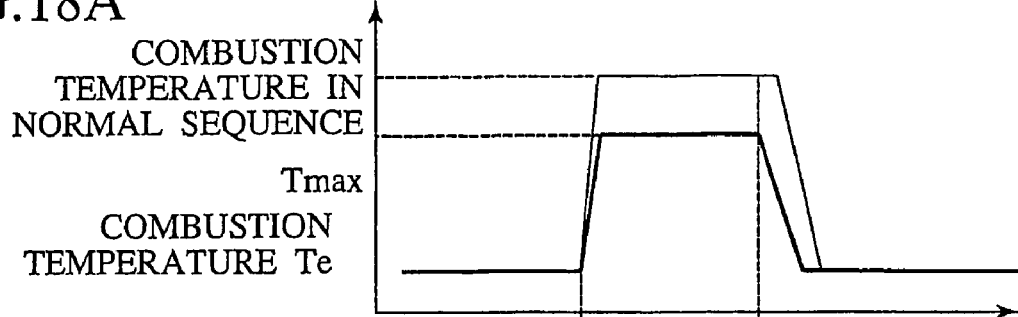
Figure 18B:
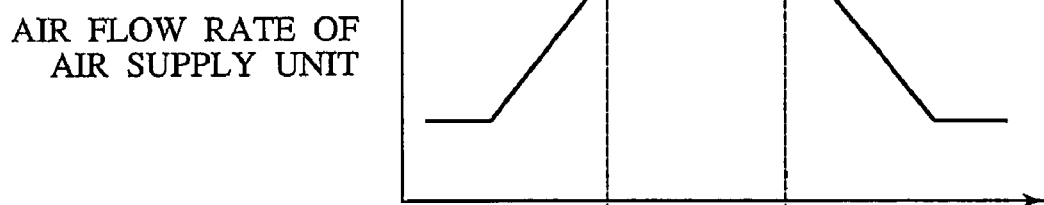
Figure 18C:
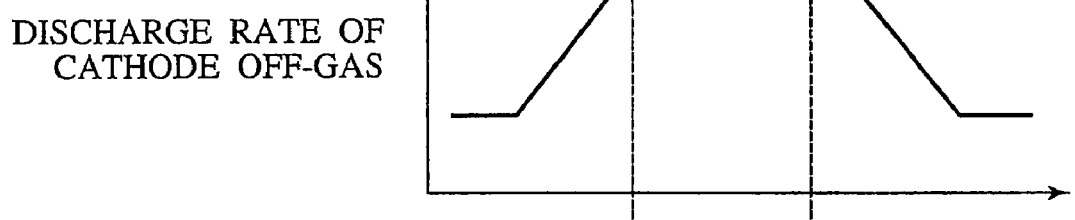
Figure 18D:
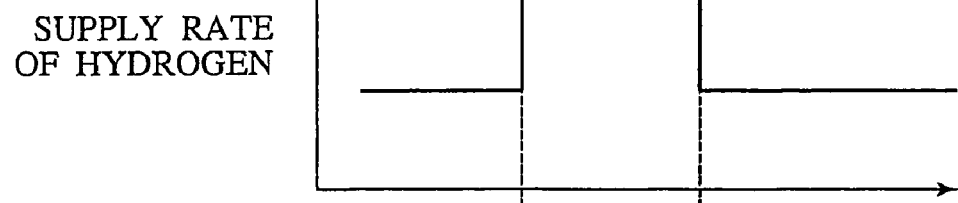
Figure 18E:
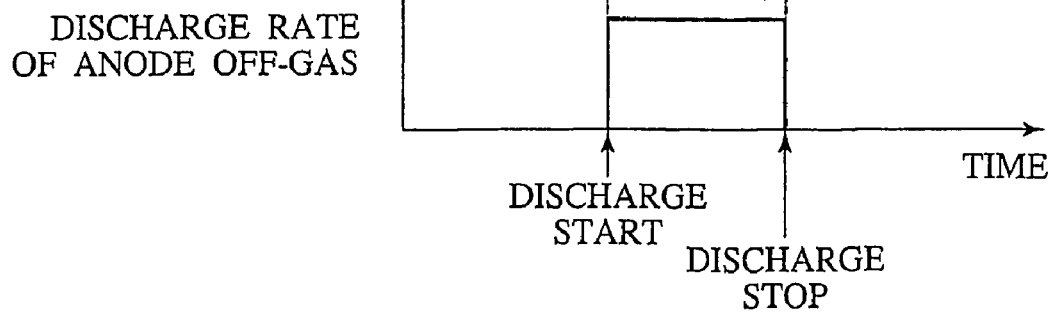

FIGS. 18A to 18E are time charts illustrating combustion temperature control of a seventh embodiment, with FIG. 18A showing the combustion temperature Te of the combustor 7, FIG. 18B showing the flow rate of air supplied from the air supply unit 2, FIG. 18C showing the discharge rate of cathode off-gas, FIG. 18D showing the flow rate of hydrogen supplied from the hydrogen supply unit 1 and FIG. 18E showing the discharge rate of anode off-gas.

FIG. 19 is a flowchart illustrating a control content of a system controller forming part of the seventh embodiment.

Figure 20:
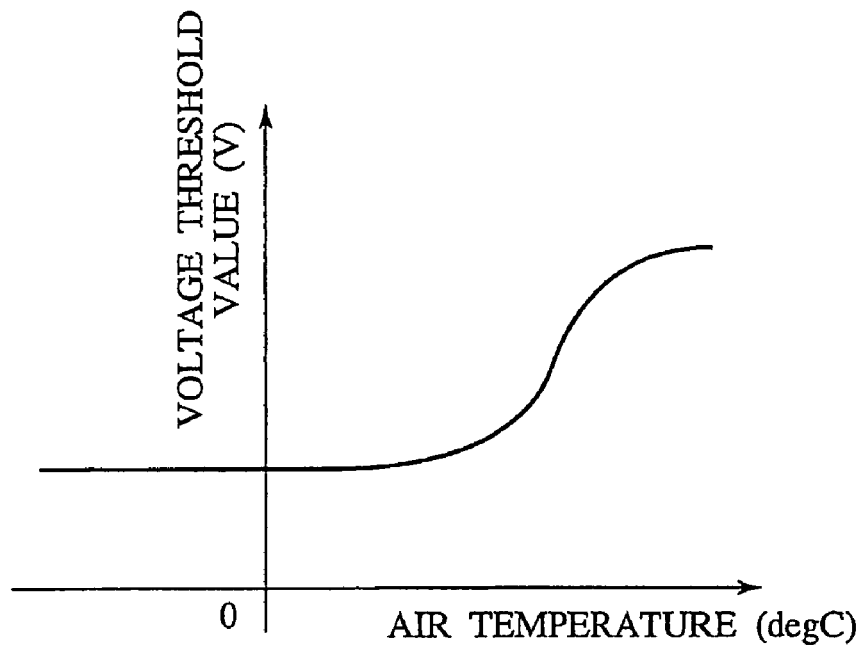

FIG. 20 is a view illustrating table data for calculating a voltage threshold value for judgment to find whether to execute purging of anode off-gas in the seventh embodiment.

Figure 21:
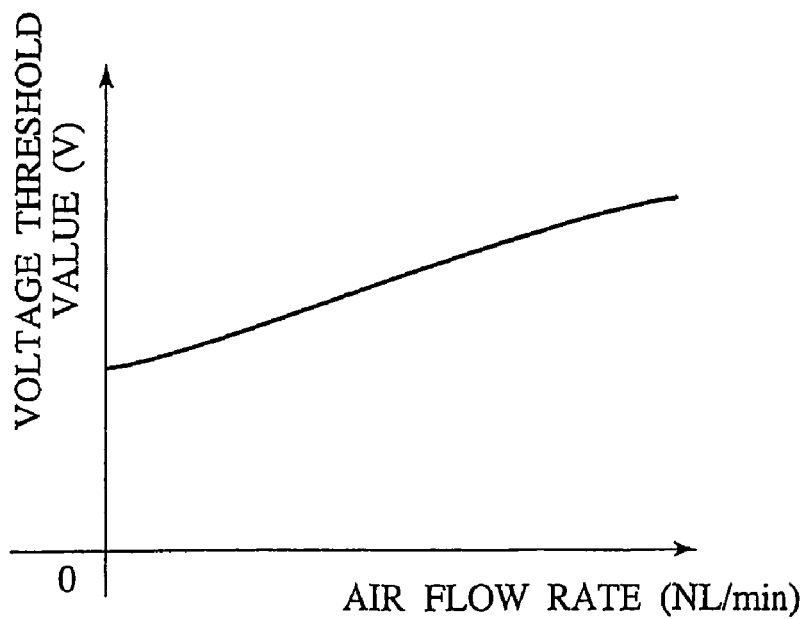

FIG. 21 is a view illustrating table data for calculating the voltage threshold value for judgment to find whether to execute purging of anode off-gas in the seventh embodiment.

Figure 22:
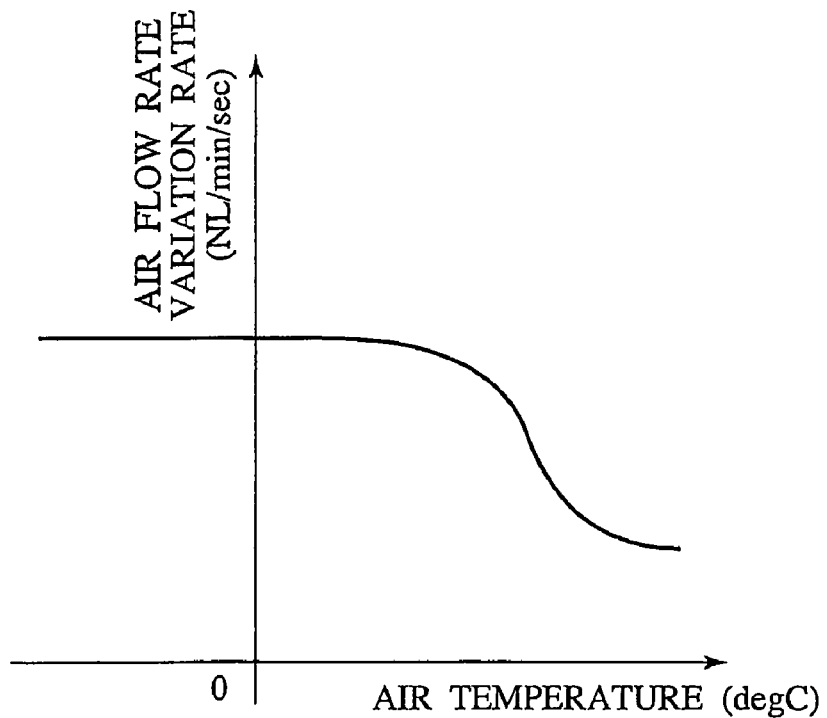

FIG. 22 is a view illustrating table data for calculating the variation rate of the air flow rate in the seventh embodiment.

Figure 23:
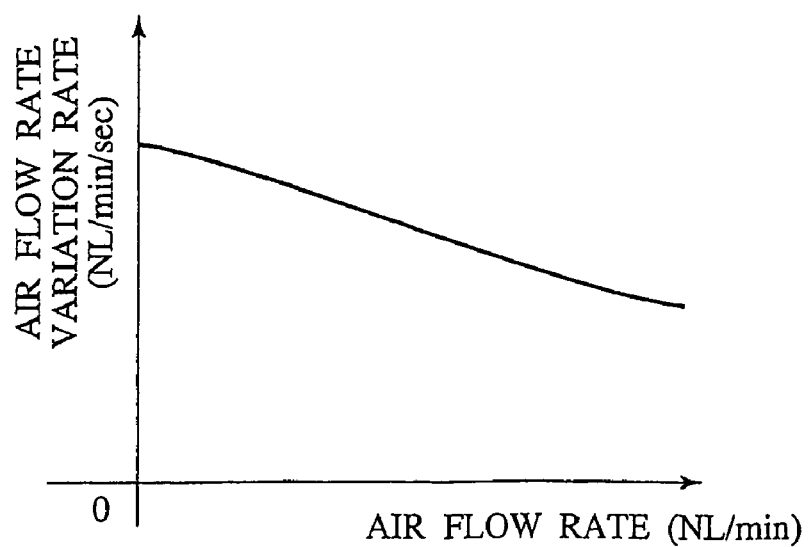

FIG. 23 is a view illustrating table data for calculating the variation rate of the air flow rate in the seventh embodiment.

Figure 24:
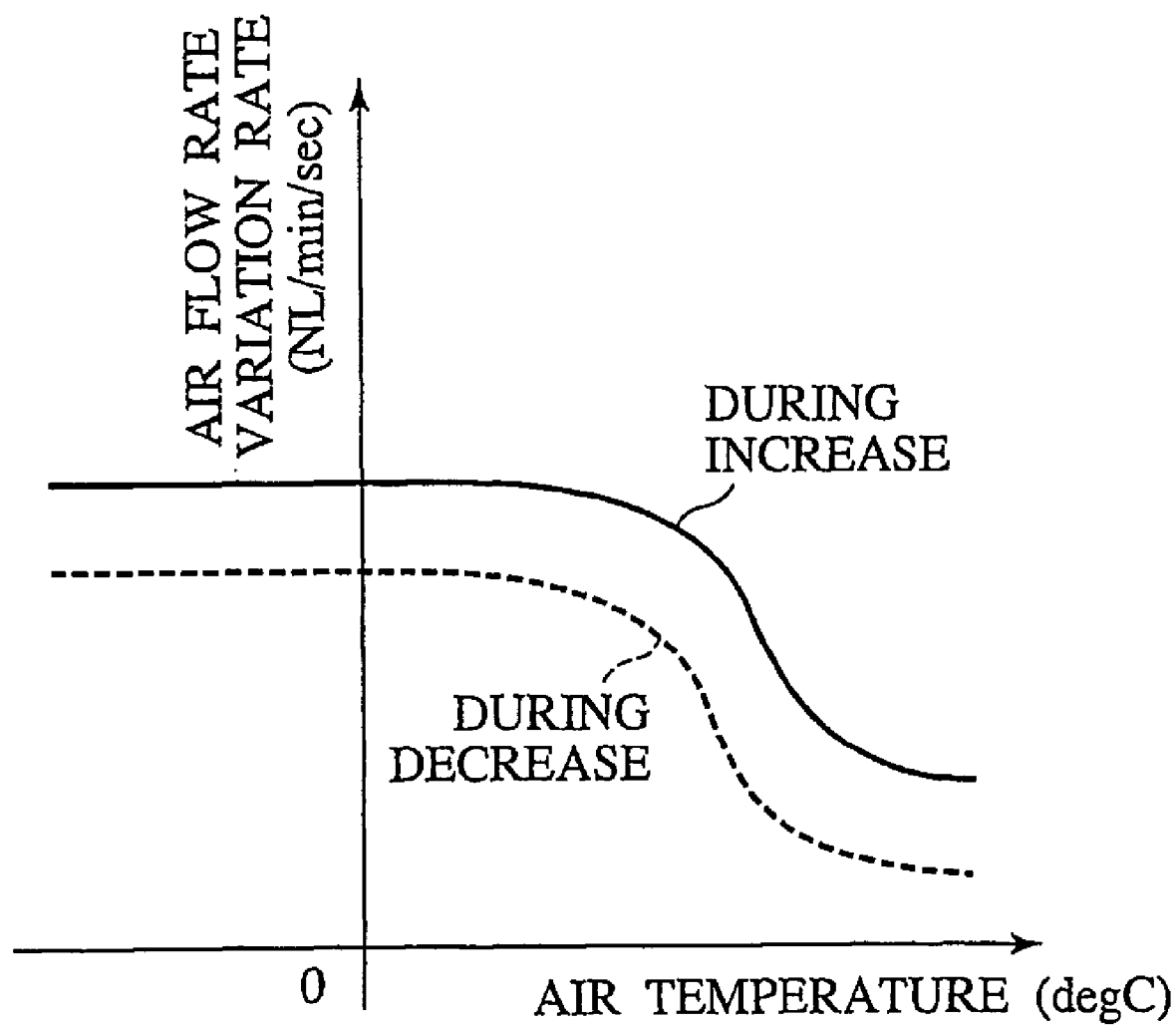

FIG. 24 is a view illustrating table data for calculating the variation rate of the air flow rate in the seventh embodiment.

BEST MODE FOR CARRYING OUT THE INVENTION

First Embodiment

Figure 1:
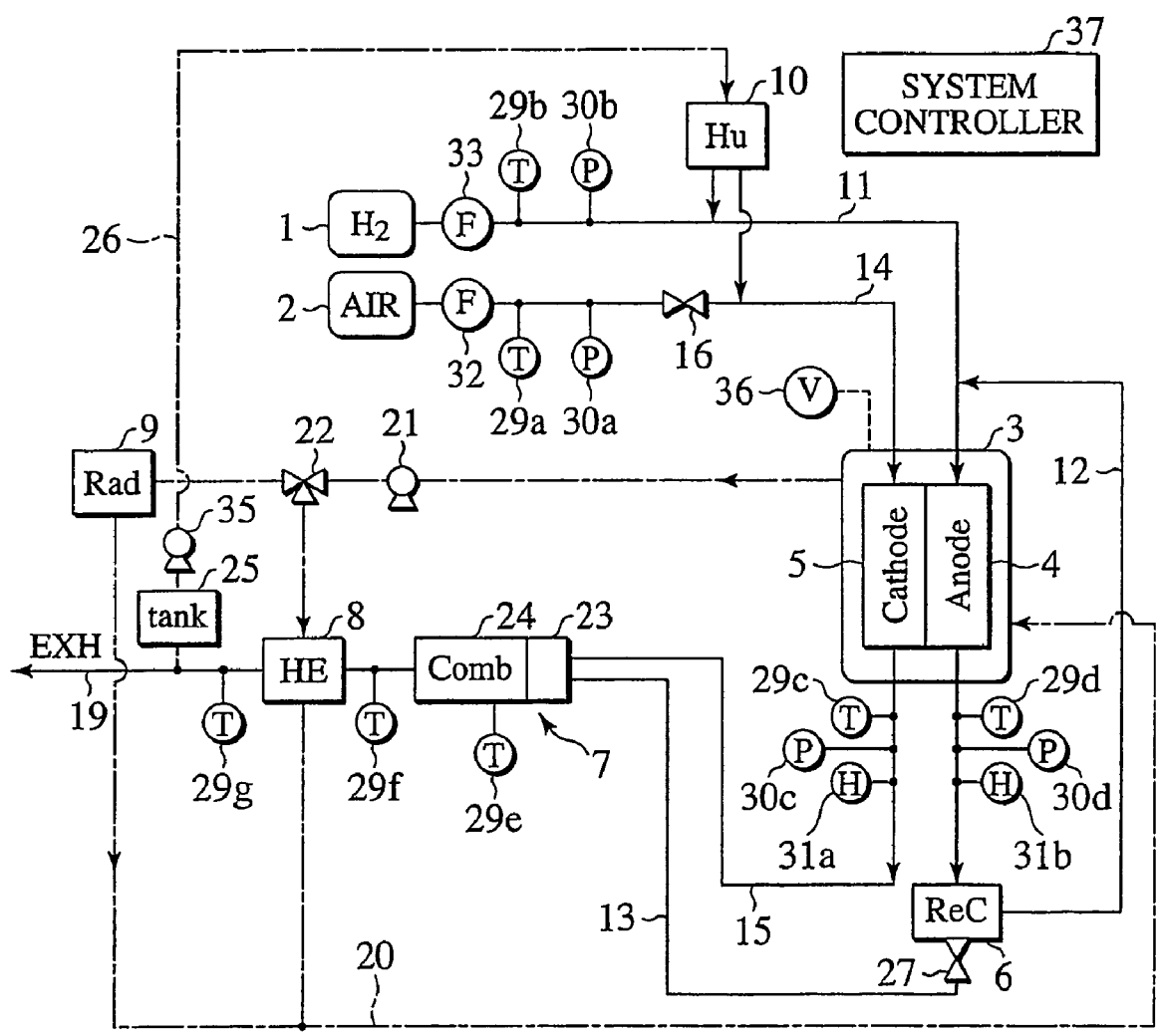
FIG. 1 is a system structural view illustrating a structure of a first embodiment of a fuel cell system according to the present invention.

Referring to FIGS. 1 to 3, a first embodiment of a fuel cell system according to the present invention is described in detail below.

FIG. 1 is a system structural view illustrating a structure of the first embodiment. In the figure, the fuel cell system is comprised of a hydrogen supply unit (fuel gas supply unit) 1 that supplies hydrogen as fuel gas; an air supply unit (oxidant gas supply unit) 2 that supplies air as oxidant gas; a fuel cell stack 3 that includes electrodes, such as an anode 4 and a cathode 5, which are supplied with hydrogen and air, respectively, to generate electric power; an anode off-gas recirculation unit 6 that allows anode off-gas to be recirculated to an upstream side of the anode 4 via an anode off-gas recirculation conduit 12; a coolant heat exchanger 8 that heats coolant with combustion exhaust gas of a combustor 7 during start-up; a coolant cooling unit 9; a humidifier 10 that allows hydrogen and air to be humidified, an air flow control valve 16; a coolant pump 21 operative to circulate coolant between the heat exchanger 8 or the coolant cooling unit and the fuel cell stack 3; a three-way valve 22 that allows a coolant flow passage to be changed over to the heat exchanger 8 or the coolant cooling unit 9; an anode off-gas discharge valve (purge means) 27 that expels anode off-gas to the outside from the anode off-gas recirculation unit 6; temperature detectors 29a to 29g; pressure detectors 30a to 30d; humidity detectors 31a and 31b; an air flow meter 32; a hydrogen flow meter 33; a voltage detector means 36 that detects a cell voltage of the fuel cell stack 3; and a system controller (system control means) 37 that controls an overall fuel cell system.

In the following description, a phase to allow anode off-gas to be temporarily discharged from the anode off-gas recirculation unit 6 to the combustor 7 is termed "purging".

The combustor 7 is constructed of a mixer 23 for mixing hydrogen or anode off-gas supplied with air or cathode off-gas to form uniformly mixed gas, and a combustor 24 carrying a combustion catalyst to combust mixed gas.

Located in the combustion chamber 24 is a temperature detector 29e, and information of resulting detected temperature is delivered to the system controller 37 through a signal line, which is not shown.

The combustor 7 is supplied with hydrogen through the anode off-gas discharge valve 27, air from the air supply unit 2 through the air flow control valve 16, and cathode off-gas via a cathode off-gas exhaust conduit 15. These gasses are mixed in the mixer 23, with mixed gas being combusted with the combustion catalyst 24. The combustion gas resulting from the combustor 7 during start-up of the fuel cell system is used in the coolant heat exchanger 8 for heat exchange with coolant to raise a coolant temperature to an operating temperature. Subsequently, resulting exhaust gas is expelled through an exhaust conduit 19 to the outside of the system. Also, condensed water is recovered from the exhaust conduit 19 and stored in a pure water tank 25.

The pure water stored in the pure water tank 25 is supplied through a pure water conduit 26 to the humidifier 10 by a pure water pump 35. The humidifier 10 uses this pure water to humidify hydrogen and air to be supplied to the fuel cell stack 3.

The temperature of the fuel cell stack 3 is managed through coolant, such as antifreeze mixture, such that the operating temperature is maintained at an appropriate temperature. For this reason, during a normal operation mode, the three-way valve 22 permits the coolant pump 21 and the coolant cooling unit 9 to communicate one another, thereby allowing coolant to circulate through a closed circuit comprised of the coolant pump 21, the three-way valve 22, the coolant cooling unit 9, the fuel cell stack 3, and the coolant pump 21. This allows heat buildup of the fuel cell stack 3 to be discharged from the coolant cooling unit 9 to the outside of the system, thereby maintaining the temperature of the fuel cell stack 3 at the appropriate temperature.

In the meanwhile, during start-up of the fuel cell system, the three-way valve 22 permits the coolant pump 21 and the coolant heat exchanger 8 to communicate one another, thereby allowing coolant to circulate through a closed circuit comprised of the coolant pump 21, the three-way valve 22, the coolant heat exchanger 8, the fuel cell stack 3, and the coolant pump 21. This allows the coolant temperature to develop in the coolant heat exchanger 8, thereby enabling the temperature of the fuel cell stack 3 to be raised to the temperature appropriate for commencing operation.

The system controller 37 serves as a system control means that controls the system to prevent the combustion temperature of the combustor 7 from exceeding a given temperature when anode off-gas is discharged to the combustor 7 through the anode off-gas discharge valve 27.

Further, the system controller 37 are connected to the air flow meter 32, the hydrogen flow meter 33, the temperature detectors 29a to 29g, the pressure detectors 30a to 30d, the humidity detectors 31a and 31b, and the voltage detector means 36. Thus, from these units, the system controller 37 is able to be applied with the flow rate, temperature and pressure of air supplied from the air supply unit 2, the flow rate, temperature and pressure of hydrogen supplied from the hydrogen supply unit 1, the temperature, pressure and humidity of cathode off-gas expelled from the cathode 5, and the temperature, pressure and humidity of anode off-gas expelled from the anode 4, respectively.

In addition, the voltage detector means 36 detects voltages of respective unit cells or voltages of respective groups, each formed of a plurality of unit cells, that form the fuel cell stack 3, with resulting voltage values being outputted to the system controller 37.

The system controller 37 is applied with the detection signals delivered from the above units and an electric-power-generation load command signal. By using these signals, the system controller 37 controls the hydrogen supply unit 1, the air supply unit 2, the anode off-gas recirculation unit 6, the coolant pump 21, the pure water pump 35, the air flow control valve 16, the three-way valve 22 and the anode off-gas discharge valve 27 for thereby controlling the flow rates of hydrogen and air to be supplied to the fuel cell stack 3 and the temperature of the fuel cell stack 3. Additionally, the system controller 37 executes control such that when permitting anode off-gas to be discharged to the combustor 7 through the anode off-gas discharge valve 27, the combustion temperature of the combustor 7 does not exceed the given temperature. Also, though not intended to be particularly limited, in the presently filed embodiment, the system controller 37 is comprised of a microcomputer that includes a CPU, a memory and I/O interfaces.

Now, a basic sequence of operations of the fuel cell system is described as below. The anode 4 and the cathode 5 are supplied with hydrogen and air from the hydrogen supply unit 1 and the air supply unit 2, respectively. Then, electric power is generated by reacting hydrogen and air in the fuel cell stack 3. During such operation, residual anode off-gas resulting from the anode 4 without being consumed therein, cathode off-gas resulting from the cathode 5 with a part of the oxygen being consumed, and containing moisture resulting from electric power generation, are respectively exhausted.

During normal operation, a whole of the anode off-gas is recirculated through the anode off-gas recirculation conduit 12 to the hydrogen supply conduit 11 by means of the anode off-gas recirculation unit 6. Then, the whole of the anode off-gas is supplied to the anode 4 again.

The cathode off-gas is supplied to the combustor 7 and, thereafter, expelled through the coolant heat exchanger 8 and the exhaust conduit 19 to the outside of the system.

Here, if the voltage detector means 36, that detects the cell voltages of the fuel cell stack 3, detects a voltage lower than a given voltage value, anode off-gas is discharged to the combustor 7 at a given flow rate from the anode off-gas discharge valve 27 in response to a purge signal delivered from the system controller 37. At the same time, the flow rate of hydrogen supplied from the hydrogen supply unit 1 is increased by substantially the same flow rate as that of anode off-gas being discharged while the pressure of hydrogen to be supplied is kept constant.

During such operation, gas compositions, even containing steam, of cathode off-gas, and an enthalpy of cathode off-gas are calculated in dependence on the air flow rate detected by the air flow meter 32, the hydrogen flow rate detected by the hydrogen flow meter 33, the cathode off-gas temperature detected by the temperature detector 29c, the cathode off-gas pressure detected by the pressure detector 30a, and the cathode off-gas humidity detected by the humidity detector 31a.

In the meantime, it is assumed that the composition of anode off-gas discharged from the anode off-gas recirculation unit 6 is formed of only hydrogen. Under this assumption, the enthalpy of anode off-gas is calculated in dependence on a predetermined anode off-gas discharge rate and the temperature of anode off-gas detected by the temperature detector 29d.

Depending on the calculated enthalpies of cathode off-gas and anode off-gas, a predicted value of the combustion temperature in the combustor 7 is calculated. One example of a calculation method is indicated below.

The enthalpy (unit: KJ/mol) per one mol of each gas composition is expressed in the following formula as a function of an absolute temperature T (unit: K):

$$Hydrogen: Hh2(T) = -8.64597E+00 + 2.90620E-02 \times T - 4.10000E-07 \times T^2 + 6.63433E-10 \times T^3, \quad (1)$$

$$Oxygen: Ho2(T) = -8.18267E+01 + 2.55940E-02 \times T + 6.62550E-06 \times T^2 - 1.40167E-09 \times T^3, \quad (2)$$

$$Nitrogen: Hn2(T) = -8.31059E+01 + 2.70160E-02 \times T + 2.90600E-06 \times T^2 - 9.63333E-11 \times T^3, \quad (3)$$

$$Water: Hh2o(T) = -2.51277E+01 + 3.02040E-02 \times T + 4.96650E-06 \times T^2 - 3.72333E-09 \times T^3. \quad (4)$$

Here, we define the flow rate of oxygen and the flow rate of nitrogen, which are contained in cathode off-gas extracted from the flow rate Qsa (mol/sec) of air and the flow rate Qsh (mol/sec) of hydrogen to be supplied to fuel cell stack 3, as QCo2 (mol/sec) and QCn2 (mol/sec) respectively, and the steam flow rate, which is obtained based on the temperature Tc (K), the pressure Pc (KPa) and the relative humidity Huc (%) of cathode off-gas detected by the temperature detector 29c, the pressure detector 30c and the humidity detector 31a respectively, as QCh2o (mol/sec), and the flow rate of anode off-gas determined by the opening degree of the anode off-gas discharge valve 27 as QAh2 (mol/sec), and the temperature of anode off-gas as Ta (K).

Under these definitions, supposing that the composition of air is given by oxygen: nitrogen=0.21:0.79, the flow rate of oxygen and nitrogen QCo2 and QCn2, and the steam flow rate QCh2o are expressed as follows:

$$QCo2 = 0.21 \times Qsa - Qsh/2, \quad (5)$$

$$QCn2 = 0.79 \times Qsa, \quad (6)$$

$$QCh2o = (QCo2 + QCn2) \times (Huh2o(Tc) \times Huc/100)/(Pc - Huh2o(Tc) \times Huc/100), \quad (7)$$

here Huh2o(Tc) is the saturated steam pressure (KPa) at the temperature Tc.

Then, the enthalpy HC of cathode off-gas per unit time and the enthalpy HA of anode off-gas per unit time are expressed by the following formulae based on the formulae (1), (2), (3) and (4):

$$HC(Tc) = Ho2(Tc) \times QCo2 + Hn2(Tc) \times QCn2 + Hh2o(Tc) \times Qh2o(KJ/sec), \quad (8)$$

$$HA(Ta) = Hh2(Ta) \times Qah2(KJ/sec), \quad (9)$$

Next, the combustion temperature appearing when combusted in the combustor 7 is calculated.

Assuming that hydrogen in anode off-gas is completely combusted, the flow rates of respective components of combustion gas can be estimated based on the compositions and the flow rates of cathode off-gas and anode off-gas in a manner described below:

$$Oxygen\ flow\ rate: QEo2 = QCo2 - QAh2/2(mol/sec), \quad (10)$$

$$Nitrogen\ flow\ rate: QEn2 = QCn2(mol/sec), \quad (11)$$

$$Steam\ flow\ rate: QEh2o = QCh2o + QAh2(mol/sec), \quad (12)$$

Here, defining the combustion temperature as Te(K), from the formulae (2), (3) and (4), the enthalpy HE of combustion gas per unit time is expressed in the following formulae:

$$HE(Te) = Ho2(Te) \times QEo2 + Hn2(Te) \times QEn2 + Hh2o(Te) \times QEh2o(KJ/sec). \quad (13)$$

Also, assuming that a lower calorific value of hydrogen is 241.8 (KJ/mol), a reaction heat Hb of hydrogen per unit time is expressed as $$Hb = 241.8 \times QAh2(KJ/sec). \quad (14)$$

Carrying out convergent calculation for the combustion temperature Te based on the formulae (8), (9), (13) and (14) in a way to allow the following formulae, the combustion temperature Te is obtained as $$HC(Tc) + HA(Ta) = HE(Te) + Hb. \quad (15)$$

Although it is supposed that anode off-gas originally includes nitrogen and water which are diffused in areas covering the cathode 5 and the anode 4 via an electrolyte membrane, a hydrogen concentration increases whereas inversely, an impurity concentration decreases as purging of anode off-gas proceeds.

For this reason, upon calculation of the combustion temperature on the assumption that the composition of anode off-gas includes only hydrogen, it is possible to take a measure to the combustion temperature in consideration of a situation under which the combustor 7 is supplied with anode off-gas with a hydrogen concentration of substantially 100% as a result of the anode off-gas recirculation system, composed of the hydrogen passage inside the fuel cell stack 3, the anode off-gas recirculation unit 6 and the anode off-gas recirculation conduit 12, being entirely substituted with hydrogen at a final stage of anode off-gas being discharged. Therefore, excessive temperature rise of the combustor 7 can be avoided.

Also, under situations where transient gas compositions can be grasped by the measuring means such as the temperature detectors 29c, 29d and the humidity detectors 31a, 31b with sufficiently high responses can be grasped and the flow rates of supplied gases are able to be achieved at favorable responses, control may also be executed by obtaining the enthalpy for each gas component and calculating the combustion temperature even for anode off-gas.

Here, if a predicted value of the combustion temperature as a result of calculation is less than a predetermined upper limit value, no flow conditions are altered.

However, if the predicted value of the combustion temperature exceeds the upper limit value, for the purpose of permitting the combustion temperature to be less than the upper limit value, the amount of air to be supplied to the combustor 7 through the fuel cell stack 3 is increased, thereby performing control such that the combustion temperature is restricted to a value below the upper limit value.

In this instance, calculation of such incremental amount of air is carried out in a sequence described below.

First, suppose that the air flow rate to be increased is Qair (mol/sec) and the enthalpy Hair of a gaseous mixture between incremental air and steam, that is taken out with incremental from the fuel cell stack 3, is assumed in the formulae (2), (3), (4) based on the temperature Tc(K). On such assumption, since the heat capacity of the fuel cell stack 3 is adequately large even when increasing the flow rate of air to be supplied to the fuel cell stack 3, while at the same time, the wetting degree of the interior of the fuel cell stack 3 is sufficient, it is regarded that no variation takes place in the temperature Tc and a relative humidity Huc of cathode off-gas when taking a view of short term. Thus, $$Hair(Tc) = Qair \times 0.21 \times Ho2(Tc) + Qair \times 0.79 \times Hn2(Tc) + \quad (16)$$
$$Qair \times (Huh2o(Tc) \times Huc/100/$$
$$(Pc - Huh2o(Tc) \times Huc/100))\ (KJ/sec).$$

Next, the flow rates of oxygen, nitrogen and steam in combustion gas are added by a value equal to the incremental flow rate of air, and the enthalpy HE(Te)' of combustion gas resulting at the temperature Te is expressed in formulae described below:

$$QEo2'=Qco2-Qao2+0.21\times Qair(mol/sec), \quad (10)'$$

$$QEn2'=QCn2+0.71\times Qair(mol/sec), \quad (11)'$$

$$QEh2o'=QEh2o+Qair\times(Huh2o(Tc)\times Huc/100/(Pc-Huh2o(Tc)\times Huc/100))(mol/sec), \quad (12)'$$

$$HE(Te)'=Ho2(Te)\times QEo2'+Hn2(Te)\times QEn2'+Hh2o(Te)\times QEh2o'(KJ/sec). \quad (13)'$$

Adding a value of Hair to a left side of the equation (15) and substituting a predetermined combustion temperature upper limit value Tmax in the combustion temperature Te of a right side, convergent calculation is executed in terms of the air flow rate Qair, and Qair is calculated as follows:

$$HC(Tc)+HA(Ta)+Hair(Tc)=HE(Tmax)'+Hb. \quad (17)$$

At the point of time in which a given anode off-gas discharge time has elapsed, discharging of anode off-gas to the combustor 7 is interrupted while at the same time, interrupting the increase in the flow rate of hydrogen supplied from the hydrogen supply unit 1 and the increase in the flow rate of air to be supplied from the air supply unit 2, whereupon operation is shifted to normal operation.

FIGS. 2A to 2E are flowcharts for illustrating combustion temperature control in the first embodiment, with FIG. 2A showing the combustion temperature Te of the combustor 7, FIG. 2B showing the flow rate of air to be supplied from the air supply unit 2, FIG. 2C showing the discharge rate of cathode off-gas, FIG. 2D showing the flow rate of hydrogen to be supplied from the hydrogen supply unit 1 and FIG. 2E showing the discharge rate of anode off-gas.

In FIGS. 2A to 2E, since the flow rate of hydrogen to be supplied from the hydrogen supply unit 1 is increased by the same flow rate as that of anode off-gas to be discharged concurrent with the discharging of anode off-gas, an output of the fuel cell stack 3 is kept constant for a time interval prior to and after commencement of the discharging of the anode off-gas. Also, when in operation where the predicted combustion temperature Te exceeds the combustion temperature upper limit value Tmax, since the flow rate of air to be supplied from the air supply unit 2 is increased and the discharge rate of cathode off-gas is increased as shown in FIG. 2C, it is so controlled that in actual practice, the combustion temperature in the combustor is avoided from exceeding the combustion temperature upper limit value Tmax.

By so doing, an advantageous effect results in that no situation takes place where the combustion temperature exceeds the combustion temperature upper limit value Tmax, unlike the related art fuel cell system suffered from an excessive temperature rise as indicated by a thin solid line in FIG. 2A, and the combustion catalyst of the combustor is enabled to be prevented from being degraded.

FIG. 3 is a flowchart for illustrating a control function of the system controller in the first embodiment.

First, in step (hereinafter abbreviated as "S") 10, the cell voltage of the fuel cell stack 3 is detected by the voltage detector means 36, and judgment is made to find whether the cell voltage is less than the given value. If the voltage for each unit cell or the voltage for each group of the unit cells detected by the voltage detector means 36 drop below the given value, operation is routed to S12. If these voltages exceed the given value, then operation is routed back to S10, thereby repeatedly executing detection of the cell voltages and judgment thereof. In S12, the combustion temperature Te is calculated for predicting the combustion temperature resulting when discharging anode off-gas, upon purging operation to recover the cell voltage, to the combustor 7. The predicted value of this combustion temperature Te is calculated, based on the enthalpy calculation for gases flowing into or flowing out from the combustor 7, using the above formulae (1) to (15).

In S14, judgment is made to find whether the combustion temperature Te exceeds the combustion temperature upper limit value Tmax. In judgment in S14, if the combustion temperature Te does not exceed the combustion temperature upper limit value Tmax, operation is routed to S40 to carry out normal purging.

In judgment in S14, if it is judged that the combustion temperature Te exceeds the predetermined combustion temperature upper limit value Tmax, operations subsequent to S16 are executed to carry out the purging while controlling such that the flow rate of air to be supplied to the combustor 7 is increased to preclude the combustion temperature Te of the combustor 7 from exceeding the combustion temperature upper limit value Tmax.

In S16, the flow rate Qair of air to be increased is calculated. During such calculation, as set forth above in terms of the above formulae (1) to (17), the flow rate Qair of air to be increased can be obtained based on the enthalpy calculation where when taking a view in a sense of short term, no variations are regarded to take place in the temperature Tc and the relative humidity Huc of cathode off-gas.

In next S18, a purge command is transmitted from the system controller 37 to the air supply unit 2, the anode off-gas discharge valve 27 and the hydrogen supply unit 1. Upon receipt of this purge command, in S20, the air supply unit 2 increases the flow rate of air to be supplied to the cathode 5 while, in S24, the anode off-gas discharge valve 27 is opened and, in S26, the hydrogen supply unit 1 increases the flow rate of hydrogen to be supplied to the anode 4.

In subsequent S28, judgment is made to find whether the given time interval Tp has elapsed from the commencement of purging and, if not, operation is routed back to S28. If the given time interval Tp has elapsed from the commencement of purging, operation is routed to S30. In S30, the increment in the flow rate of hydrogen to be supplied from the hydrogen supply unit 1 is interrupted and, in S32, the anode off-gas discharge valve 27 is closed while, in S34, interrupting the increment of the flow rate of air to be supplied from the air supply unit 2. This allows the fuel cell system to be returned to the normal operating condition.

In the meanwhile, in S40, a process is begun to discharge anode off-gas under the given condition. In S42, the purge command is transmitted from the system controller 37 to the anode off-gas discharge valve 27 and the hydrogen supply unit 1. Upon receipt of this purge command, in S44, the anode off-gas discharge valve 27 is opened and, in S46, the hydrogen supply unit 1 increases the flow rate of hydrogen to be supplied to the anode 4.

In consecutive S48, judgment is made to find whether the given time interval Tp has elapsed from the commencement of purging and, if not, operation is routed back to S48. If the given time interval Tp has elapsed from the commencement of purging, operation is routed to S50. In S50, the increment in the flow rate of hydrogen to be supplied from the hydrogen supply unit 1 is interrupted and, in S52, the anode off-gas discharge valve 27 is closed. This allows the fuel cell system to be returned to the normal operating condition.

With the presently filed embodiment set forth above, by controlling the temperature of combustion gas resulting in the combustor in a way not to exceed the given temperature when discharging anode off-gas from the anode off-gas recirculation unit, there is an advantageous effect in that degradation in performance of the combustor due to an excessive thermal load can be suppressed.

Further, due to an ability of predicting at least one of the flow rate and composition of mixed gas entering the combustor depending on an operating load of the fuel cell stack for thereby preliminarily predicting the combustion temperature, the system is controlled so as to preclude the combustion temperature from exceeding the given temperature in the presence of a probability where the combustion temperature exceeds the given temperature whereby even if a discrepancy occurs between the combustor inlet temperature and the combustor outlet temperature as a result of combustion being accomplished only for a short time period, excessive temperature rise is restricted in the combustor as a whole to suppress degradation in performance of the combustor due to the excessive thermal load.

Second Embodiment

Next, referring to FIGS. 4 to 6, detailed description is made of a second embodiment of a fuel cell system according to the present invention.

FIG. 4 is a system structural view illustrating a structure of the second embodiment. In the second embodiment, the fuel cell system is constructed such that an air flow control valve 17 and an air supply conduit 18 are additionally located between the air supply unit 2 and the combustor 7 to enable a portion of air supplied from the air supply unit 2 to be branched off and directly supplied to the combustor 7. The second embodiment is similar in other structure to that of the first embodiment shown in FIG. 1 and, so, like component parts bear the same reference numerals as those of the first embodiment for omitting duplicated description.

With such a structure set forth above, the presently filed embodiment is enabled to directly supply air from the air supply unit 2 to the combustor 7 through the air flow control valve 17 without intervening the fuel cell stack 3, an improved quick response for increasing the flow rate of air to be supplied to the combustor 7 is resulted, thereby more accurately limiting a rise in the combustion temperature.

In such case, a demanded flow rate of air to be increased is conducted in the same way as that of the first embodiment except for that the temperature Tair(K), detected by the temperature detector 29a which detects the temperature of air to be supplied from the air supply unit 2, is used in place of Tc(K) as the temperature of air to be increased and that since air to be increased is directly supplied to the combustor 7 without intervening the fuel cell stack 3, no consideration is taken for the flow rate of steam to be increased accompanied by the air increase.

In such operation, substituting the following formulae instead of the formulae (16) and (13)' into a formula (17), the increasing amount of the flow rate of air can be calculated.

$$Hair(Tair) = Qair \times 0.21 \times Ho2(Tair) + Qair \times 0.79 \times Hn2(Tair) \ (KJ/sec), \quad (16)'$$

$$HE(Te)' = Ho2(Te) \times QEo2' + Hn2(Te) \times QEn2' + Hh2o(Te) \times QEh2o(KJ/sec). \quad (13)'''$$

FIGS. 5A to 5E are flowcharts for illustrating combustion temperature control in the second embodiment, with FIG. 5A showing the combustion temperature Te of the combustor 7, FIG. 5B showing the flow rate of air to be supplied from the air supply unit 2, FIG. 5C showing the discharge rate of cathode off-gas, FIG. 5D showing the flow rate of hydrogen to be supplied from the hydrogen supply unit 1 and FIG. 5E showing the discharge rate of anode off-gas.

In FIGS. 5A to 5E, since as soon as anode off-gas is discharged, the flow rate of hydrogen to be supplied from the hydrogen supply unit 1 is increased by the same rate as that of anode off-gas being discharged, an output of the fuel cell stack 3 is kept constant for a time interval prior to and aft to commencement of discharging anode off-gas. Also, since the flow rate of air to be supplied from the air supply unit 2 through the air flow control valve 17 is increased when the predicted combustion temperature Te exceeds the combustion temperature upper limit value Tmax, control is such that an actual combustion temperature in the combustor does not exceed the combustion temperature upper limit value Tmax. When this takes place, since the flow path of air to be increased is independent from the flow path through which cathode off-gas flows, no variation takes place in the discharge rate of cathode off-gas, as shown in FIG. 5C, which is kept at a fixed value.

By so doing, an advantageous effect results in that no situation takes place where the combustion temperature exceeds the combustion temperature upper limit value Tmax, unlike the related art fuel cell system suffered from an excessive temperature rise as indicated by a thin solid line in FIG. 5A, and the combustion catalyst of the combustor is enabled to be prevented from being degraded.

FIG. 6 is a flowchart for illustrating a control function of the system controller of the second embodiment.

First, in S10, the cell voltage of the fuel cell stack 3 is detected by the voltage detector means 36, and judgment is made to find whether the cell voltage is less than the given value. If the voltage for each unit cell or the voltage for each group of the unit cells detected by the voltage detector means 36 drop below the given value, operation is routed to S12. If these voltages exceed the given value, then operation is routed back to S10, thereby repeatedly executing detection of the cell voltages and judgment thereof. In S12, the combustion temperature Te is calculated for predicting the combustion temperature resulting when discharging anode off-gas, upon purging operation to recover the cell voltage, to the combustor 7. The predicted value of this combustion temperature Te is calculated, based on the enthalpy calculation for gases flowing into or flowing out from the combustor 7, using the above formulae (1) to (15).

In S14, judgment is made to find whether the combustion temperature Te exceeds the predetermined combustion temperature upper limit value Tmax. In judgment in S14, if the combustion temperature Te does not exceeds the combustion temperature upper limit value Tmax, operation is routed to S40 to carry out normal purging.

In judgment in S14, if it is judged that the combustion temperature Te exceeds the combustion temperature upper limit value Tmax, operations subsequent to S16 are executed to carry out the purging while controlling such that the flow rate of air to be supplied to the combustor 7 is increased to preclude the combustion temperature Te of the combustor 7 from exceeding the combustion temperature upper limit value Tmax.

In S16, the flow rate Qair of air to be increased is calculated. During such calculation, as set forth above in terms of the above formulae (1) to (17), the flow rate Qair of air to be increased can be obtained based on the enthalpy calculation where when taking a view in a sense of short term, no variations are regarded to take place in the temperature Tc and the relative humidity Huc of cathode off-gas.

In next S18, a purge command is transmitted from the system controller 37 to the air supply unit 2, the flow rate control valves 16, 17, the anode off-gas discharge valve 27 and the hydrogen supply unit 1. Upon receipt of this purge command, in S20, the air supply unit 2 increases the flow rate of air to be supplied to the cathode 5 and, in S21, the opening degree of the air flow rate control valve 16 by which air is supplied to the cathode 5 while opening the air flow control valve 17 through which air is directly supplied from the air supply unit 2 to the combustor 7. In S24, the anode off-gas discharge valve 27 is opened while, in S26, the hydrogen supply unit 1 increases the flow rate of hydrogen to be supplied to the anode 4.

In subsequent S28, judgment is made to find whether the given time interval Tp has elapsed from the commencement of purging and, if not, operation is routed back to S28. If the given time interval Tp has elapsed from the commencement of purging, operation is routed to S30. In S30, the increase in the flow rate of hydrogen to be supplied from the hydrogen supply unit 1 is interrupted and, in S32, the anode off-gas discharge valve 27 is closed. In S33, the opening degree of the air flow rate control valve 16 is restored while closing the air flow control valve 17. In S34, operation is executed to interrupt the increase in the flow rate of air to be supplied from the air supply unit 2. This allows the fuel cell system to be returned to the normal operating condition.

In the meanwhile, the normal purging to be executed in S40 to S52 is identical in content to that described with reference to the first embodiment and, so, duplicated description is omitted.

With the second embodiment set forth above, by controlling the temperature of combustion gas resulting in the combustor in a way not to exceed the given temperature when discharging anode off-gas from the anode off-gas recirculation unit, there is an advantageous effect in that degradation in performance of the combustor due to an excessive thermal load can be suppressed.

Further, due to an ability of predicting at least one of the flow rate and composition of mixed gas entering the combustor depending on an operating load of the fuel cell stack for thereby preliminarily predicting the combustion temperature, the system is controlled so as to preclude the combustion temperature from exceeding the given temperature in the presence of a probability where the combustion temperature exceeds the given temperature whereby even if a discrepancy occurs between the combustor inlet temperature and the combustor outlet temperature as a result of combustion being accomplished only for a short time period, excessive temperature rise is restricted in the combustor as a whole to suppress degradation in performance of the combustor due to the excessive thermal load.

Furthermore, another advantageous effect resides in that when temporarily discharging anode off-gas from the anode off-gas recirculation unit, control is executed to allow the discharge rate of the oxidant gas supply unit, by which oxidant gas is supplied to the fuel cell stack, to be increased to compel a portion of oxidant gas to be directly supplied to the combustor for thereby suppressing an excessive rise in the combustion temperature, the system control can be simplified and degradation in performance of the combustor due to an excessive thermal load can be suppressed.

Third Embodiment

Next, referring to FIGS. 7 to 9, a third embodiment of a fuel cell system according to the present invention is described in detail.

FIG. 7 is a system structural view illustrating a structure of the third embodiment. The third embodiment contemplates to further include, in addition to the component elements of the first embodiment shown in FIG. 1, an auxiliary air supply unit 28 that supplies auxiliary air specific for the combustor 7, an auxiliary air flow meter 38 that measures the flow rate of auxiliary air, and a temperature detector 29$h$ that detects the temperature of auxiliary air to be supplied from the auxiliary air supply unit 28. The third embodiment is similar in other structure to that of the first embodiment shown in FIG. 1 and, so, like component parts bear the same reference numerals as those of the first embodiment for omitting duplicated description.

In contrast to the first and second embodiments, since the third embodiment is configured to allow air, to be increased during purging, to pass only through the combustor 7 and the coolant heat exchanger 8 and exhausted to the outside, flow resistance can be minimized. This enables the pressure of auxiliary air to be supplied from the auxiliary air supply unit 28 to be lessened to enable the pressure ratio in the auxiliary air supply unit 28 to be decreased for suppressing the increase in electric power consumption while at the same time, enabling control without changing the condition of air to be supplied to the fuel cell stack 3.

In such case, supposing that Qair in the third embodiment is the flow rate of auxiliary air to be supplied to the combustor 7 from the auxiliary air supply unit 28 and the temperature Tair represents the temperature detected by the temperature detector 29$h$, a demanded flow rate of auxiliary air can be calculated in the same way as that of the second embodiment.

FIGS. 8A to 8E are flowcharts for illustrating combustion temperature control in the third embodiment, with FIG. 8A showing the combustion temperature Te of the combustor 7, FIG. 8B showing the air flow rate of auxiliary air to be supplied from the auxiliary air supply unit 28, FIG. 8C showing the discharge rate of cathode off-gas, FIG. 8D showing the flow rate of hydrogen to be supplied from the hydrogen supply unit 1 and FIG. 8E showing the discharge rate of anode off-gas.

In FIGS. 8A to 8E, since as soon as anode off-gas is discharged, the flow rate of hydrogen to be supplied from the hydrogen supply unit 1 is increased by the same rate as that of anode off-gas being discharged, an output of the fuel cell stack 3 is kept constant for a time interval prior to and aft to commencement of discharging anode off-gas. Also, when the predicted combustion temperature Te exceeds the combustion temperature upper limit is value Tmax, as shown in FIG. 8B, since air is also supplied from the auxiliary air supply unit 28 to the combustor 7, control is made such that an actual combustion temperature in the combustor does not exceed the combustion temperature upper limit value Tmax.

By so doing, an advantageous effect results in that no situation takes place where the combustion temperature exceeds the combustion temperature upper limit value Tmax, unlike the related art fuel cell system suffered from an excessive temperature rise as indicated by a thin solid line in FIG. 8A, and the combustion catalyst of the combustor is enabled to be prevented from being degraded.

FIG. 9 is a flowchart for illustrating a control function of the system controller in the third embodiment.

First, in S10, the cell voltage of the fuel cell stack 3 is detected by the voltage detector means 36, and judgment is made to find whether the cell voltage is less than the given value. If the voltage for each unit cell or the voltage for each group of the unit cells detected by the voltage detector means 36 drop below the given value, operation is routed to S12. If these voltages exceed the given value, then operation is routed back to S10, thereby repeatedly executing detection of the cell voltages and judgment thereof. In S12, the combustion temperature Te is calculated for predicting the combustion temperature resulting when discharging anode off-gas, upon purging operation to recover the cell voltage, to the combustor 7. The predicted value of this combustion temperature Te is calculated, based on the enthalpy calculation for gases flowing into or flowing out from the combustor 7, using the above formulae (1) to (15).

In S14, judgment is made to find whether the combustion temperature Te exceeds the predetermined combustion temperature upper limit value Tmax. In judgment in S14, if the combustion temperature Te does not exceeds the combustion temperature upper limit value Tmax, operation is routed to S40 to carry out normal purging.

In judgment in S14, if it is judged that the combustion temperature Te exceeds the combustion temperature upper limit value Tmax, operations subsequent to S16 are executed to carry out the purging while controlling such that the flow rate of air to be supplied to the combustor 7 is increased to preclude the combustion temperature Te of the combustor 7 from exceeding the combustion temperature upper limit value Tmax.

In S16, the flow rate Qair air to be increased is calculated. During such calculation, as set forth above in terms of the above formulae (1) to (17), the flow rate Qair of air to be increased can be obtained based on the enthalpy calculation where when taking a view in a sense of short term, no variations are regarded to take place in the temperature Tc and the relative humidity Huc of cathode off-gas.

In next S18, a purge command is transmitted from the system controller 37 to the auxiliary air supply unit 28, the anode off-gas discharge valve 27 and the hydrogen supply unit 1. Upon receipt of this purge command, in S23, the auxiliary air supply unit 2 supplies auxiliary air to the combustor 7 while, in S24, the anode off-gas discharge valve 27 is opened and, in S26, the hydrogen supply unit 1 increases the flow rate of hydrogen to be supplied to the anode 4.

In subsequent S28, judgment is made to find whether the given time interval Tp has elapsed from the commencement of purging and, if not, operation is routed back to S28. If the given time interval Tp has elapsed from the commencement of purging, operation is routed to S30. In S30, an increase in the flow rate of hydrogen to be supplied from the hydrogen supply unit 1 is interrupted and, in S32, the anode off-gas discharge valve 27 is closed while interrupting the operation of the auxiliary air supply unit 28. This allows the fuel cell system to be returned to the normal operating condition.

In the meanwhile, the normal purging to be executed in S40 to S52 is identical in content to that described with reference to the first embodiment and, so, duplicated description is omitted.

With the third embodiment set forth above, control of the temperature of combustion gas, resulting from the combustor when temporarily discharging anode off-gas from the anode off-gas recirculation unit, in a way not to exceed the given temperature provides an advantageous effect to provide a capability of suppressing degradation in performance of the combustor suffered from an excessive thermal load.

Fourth Embodiment

Next, a fourth embodiment of the present invention is described with reference to FIGS. 10A to 10E and FIG. 11. The fourth embodiment has the same structure as that of the first embodiment shown in FIG. 1. The fourth embodiment has a feature wherein if judgment is made that the predicted combustion temperature exceeds the combustion temperature upper limit value, the flow rate of anode off-gas is made smaller than the predetermined discharge rate of the same and a time period in which anode off-gas is discharged is extended to lower the combustion temperature of the combustor.

For this reason, the fourth embodiment executes control such that the same calculation as that of the first embodiment is conducted before the combustion temperature Te is calculated whereby if it is judged that the calculated combustion temperature Te exceeds the combustion temperature upper limit value Tmax, the flow rate of cathode off-gas is not altered whereas the discharge rate of anode off-gas is made smaller than the predetermined flow rate and the anode off-gas is discharged for a longer time interval (Tp") than the predetermined discharge time interval (Tp).

FIGS. 10A to 10E are flowcharts for illustrating combustion temperature control in the fourth embodiment, with FIG. 10A showing the combustion temperature Te of the combustor 7, FIG. 10B showing the discharge rate of cathode off-gas, FIG. 10C showing the flow rate of hydrogen to be supplied from the hydrogen supply unit 1, and FIG. 10D showing the discharge rate of anode off-gas.

When the predicted combustion temperature Te exceeds the combustion temperature upper limit value Tmax, as shown in FIG. 10D, the discharge rate of anode off-gas is made less than that of anode off-gas during normal purging and anode off-gas is discharged for the prolonged time interval (Tp"). This reduces the combustion heat value resulting per unit time, with a resultant reduction in the combustion temperature.

An advantageous effect results in that no situation takes place where the combustion temperature exceeds the combustion temperature upper limit value Tmax, unlike the related art fuel cell system suffered from an excessive temperature rise as indicated by a thin solid line in FIG. 10A, and the combustion catalyst of the combustor is enabled to be prevented from being degraded.

Also, when using a high pressure vessel, such as a high pressure hydrogen tank, as the hydrogen supply unit 1, since such an utility can be complied through mere adjustment of the flow rate of hydrogen to be supplied by adjusting the opening degree of the anode off-gas discharge valve, it is possible to avoid an increase in electric power consumption caused by the air supply unit 2 and the auxiliary air supply unit 28 that when increasing the air flow rate, would be required in the structures of the first to third embodiments.

Defining a predetermined discharge time interval for anode off-gas as Tp (sec), and a discharge time interval for anode off-gas after alteration as Tp", a decremental rate Rd of the flow rate of anode off-gas is defined as follows:

$$Rd = Tp''/Tp. \quad (18)$$

Then, the flow rate QAh2o" of anode off-gas occurring when decreasing the discharge rate can be expressed as $$QAh2'' = QAh2 \times Rd. \quad (19)$$

From these equations, the formulae (9), (10), (12), (13), (15) can be rewritten as $$HA(Ta)''=Hh2(Ta) \times QAh2'', (KJ/sec) \quad (9)''$$

$$QEo2''=QCo2-QAh2''/2, (mol/sec) \quad (10)''$$

$$QEh2o''=QCh2o+QAh2'', (mol/sec) \quad (12)''$$

$$HE(Te)''=Ho2(Te) \times QEo2''+Hn2(Te) \times QEn2+Hh2o(Te) \times QEh2o''(KJ/sec), \quad (13)''$$

$$HC(Tc)+HA(Ta)''=HE(Te)''+\Delta Hb. \quad (15)''$$

Next, in the above equation (15)", substituting the upper limit value Tmax into the combustion temperature Te allows convergent calculation in respect of the decremental rate Rd of the anode off-gas discharge rate, thereby calculating Rd.

Substitution of Rd given from the above in the equation (18) yields the anode off-gas discharge time interval Tp".

Also, as a technique for decreasing the hydrogen flow rate, in a case where the anode off-gas discharge valve 27 takes the form of a fixed restriction such as an orifice, it may be possible for the hydrogen supply pressure to be decreased by the hydrogen supply unit 1.

FIG. 11 is a flowchart for illustrating a control function of the system controller in the fourth embodiment.

First, in S10, the cell voltage of the fuel cell stack 3 is detected by the voltage detector means 36, and judgment is made to find whether the cell voltage is less than the given value. If the voltage for each unit cell or the voltage for each group of the unit cells detected by the voltage detector means 36 drop below the given value, operation is routed to S12. If these voltages exceed the given value, then operation is routed back to S10, thereby repeatedly executing detection of the cell voltages and judgment thereof. In S12, the combustion temperature Te is calculated for predicting the combustion temperature resulting when discharging anode off-gas, upon purging operation to recover the cell voltage, to the combustor 7. The predicted value of this combustion temperature Te is calculated, based on the enthalpy calculation for gases flowing into or flowing out from the combustor 7, using the above formulae (1) to (15).

In S14, judgment is made to find whether the combustion temperature Te exceeds the predetermined combustion temperature upper limit value Tmax. In judgment in S14, if the combustion temperature Te does not exceeds the combustion temperature upper limit value Tmax, operation is routed to S40 to carry out normal purging.

In judgment in S14, if it is judged that the combustion temperature Te exceeds the combustion temperature upper limit value Tmax, operations subsequent to S15 are executed to effectuate purging under a control in which the flow rate of anode off-gas to be supplied to the combustor 7 from the anode off-gas discharge valve 27 is decreased while the time interval for which the anode off-gas is discharged is extended for thereby precluding the combustion temperature Te of the combustor 7 from exceeding the combustion temperature upper limit value Tmax.

In S15, the decremental rate Rd of the flow rate of anode off-gas is calculated. In consecutive S17, the anode off-gas discharge time interval Tp" and the discharge rate QAh2" are calculated. When calculating these factors, the calculations can be made based on the enthalpy calculation as discussed above in terms of the above formulae (18), (19) and the formulae (9)" to (15)".

In next S18, a purge command is transmitted from the system controller 37 to the anode off-gas discharge valve 27 and the hydrogen supply unit 1.

Upon receipt of this purge command, in S24, the anode off-gas discharge valve 27 is opened while, in S26, the hydrogen supply unit 1 increases the flow rate of hydrogen to be supplied to the anode 4.

In subsequent S28, judgment is made to find whether the given time interval Tp" has elapsed from the commencement of purging and, if not, operation is routed back to S28. If the given time interval Tp" has elapsed from the commencement of purging, operation is routed to S30. In S30, an increase in the flow rate of hydrogen to be supplied from the hydrogen supply unit 1 is interrupted and, in S32, the anode off-gas discharge valve 27 is closed. This allows the fuel cell system to be returned to the normal operating condition.

In the meanwhile, the normal purging to be executed in S40 to S52 is identical in content to that described with reference to the first embodiment and, so, duplicated description is omitted.

With the fourth embodiment set forth above, there is an advantageous effect in that when compelling anode off-gas to be temporarily discharged from the anode off-gas recirculation unit, the flow rate of anode off-gas to be supplied to the combustor is made smaller than the predetermined discharge rate and the anode off-gas is controlled so as to be discharged for a prolonged time interval for thereby suppressing an excessive rise in the combustion temperature whereby the system structure can be simplified in configuration while enabling to suppress performance degradation of the combustor.

Fifth Embodiment

Next, a fifth embodiment of the present invention is described with reference to FIGS. 12A to 12E and FIG. 13. The fifth embodiment has the same structure as that of the first embodiment shown in FIG. 1. The fifth embodiment has a feature wherein if judgment is made that the predicted combustion temperature exceeds the combustion temperature upper limit value, the discharging mode of anode off-gas is altered to a discontinuous discharge mode. That is, a time interval in which the anode off-gas is discharged in one cycle is made to be shorter than a given discharge time interval and the anode off-gas is repeatedly discharged a plurality of number of times for thereby lowering the combustion temperature of the combustor.

For this reason, the fifth embodiment executes control such that the same calculation as that of the first embodiment is conducted until the combustion temperature Te is calculated whereby if it is judged that the calculated combustion temperature Te exceeds the combustion temperature upper limit value Tmax, the flow rate of cathode off-gas and the discharge rate of anode off-gas are not altered whereas the time interval in which the anode off-gas is discharged in one cycle is made to be shorter than a predetermined given discharge time interval and discharging of anode off-gas is conducted for plural number of times during a longer time period than the given discharge time interval. This allows the discharge mode of anode off-gas to be set to a predetermined alternative anode off-gas discharge time interval again to permit anode off-gas to be discharged in dispersed cycles for thereby enabling the combustion temperature of the combustor during the discharging period of anode off-gas to be suppressed to a value below the upper limit value.

A method in which the discharge time intervals are set is controlled by preliminarily and experimentally determining the discharge time Tp''' (sec), a discharge time interval Tr''' (sec) and the number X (times) of discharging for each predicted operating condition.

FIGS. 12A to 12E are flowcharts for illustrating combustion temperature control in the fourth embodiment, with FIG. 12A showing the combustion temperature Te of the combustor 7, FIG. 12B showing the flow rate of air to be supplied form the air supply unit 2, FIG. 12C showing the discharge rate of cathode off-gas, FIG. 12D showing the flow rate of hydrogen to be supplied from the hydrogen supply unit 1, and FIG. 12E showing the discharge rate of anode off-gas.

In FIGS. 12A to 12E, repeated operations are executed a plural number of times with anode off-gas being discharged for the time interval Tp''' whereas the discharging is interrupted for the time interval Tr'''. In synchronism with the discharging of anode off-gas for the time interval Tp''', the flow rate of hydrogen to be supplied from the hydrogen supply unit 1 is increased by a rate equal to the anode off-gas discharge rate. Upon operation to discharge anode off-gas in such a discontinuous manner, the combustion temperature Te takes the form of a sawtooth waveform as shown in FIG. 12A with control being executed such that a tip of the sawtooth waveform does not exceeds the combustion temperature upper limit value Tmax.

By so doing, an advantageous effect results in that no situation takes place where the combustion temperature exceeds the combustion temperature upper limit value Tmax, unlike the related art fuel cell system suffered from an excessive temperature rise as indicated by a thin solid line in FIG. 12A, and the combustion catalyst of the combustor is enabled to be prevented from being degraded.

FIG. 13 is a flowchart for illustrating a control function of the system controller in the fifth embodiment.

First, in S10, the cell voltage of the fuel cell stack 3 is detected by the voltage detector means 36, and judgment is made to find whether the cell voltage is less than the given value. If the voltage for each unit cell or the voltage for each group of the unit cells detected by the voltage detector means 36 drop below the given value, operation is routed to S12. If these voltages exceed the given value, then operation is routed back to S10, thereby repeatedly executing detection of the cell voltages and judgment thereof. In S12, using the purging operation for achieving recovery of the cell voltage allows prediction for the combustion temperature as a result of anode off-gas being discharged to the combustor 7 for combustion and, thus, the combustion temperature Te is calculated. The predicted value of this combustion temperature Te is calculated, based on the enthalpy calculation for gases flowing into or flowing out from the combustor 7, using the above formulae (1) to (15).

In S14, judgment is made to find whether the combustion temperature Te exceeds the predetermined combustion temperature upper limit value Tmax. In judgment in S14, if the combustion temperature Te does not exceeds the combustion temperature upper limit value Tmax, operation is routed to S40 to carry out normal purging.

In judgment in S14, if it is judged that the combustion temperature Te exceeds the combustion temperature upper limit value Tmax, through operations subsequent to S60, anode off-gas is discharged in the discontinuous fashion, thereby conducting the purging through control of the combustion temperature Te of the combustor 7 so as not to exceed the combustion temperature upper limit value Tmax. In S60, the incremental rate Rg of the flow rate of cathode off-gas is calculated. In S62, as a discharging condition of anode off-gas, operation is executed to set the discharge time Tp''' for one cycle, the discharging time interval Tr''' and the number X of times for discharging.

In next S64, a purge command is transmitted from the system controller 37 to the anode off-gas discharge valve 27 and the hydrogen supply unit 1. Upon receipt of this purge command, in S66, the anode off-gas discharge valve 27 is opened and, in S68, the hydrogen supply unit 1 increases the flow rate of hydrogen to be supplied to the anode 4.

In consecutive S70, judgment is made to find whether the given time interval Tp''' has elapsed from the commencement of purging and, if not, operation is routed back to S70. If the given time interval Tp''' has elapsed from the commencement of purging, operation is routed to S72. In S72, an increase in the flow rate of hydrogen to be supplied from the hydrogen supply unit 1 is interrupted and, in S74, the anode off-gas discharge valve 27 is closed. In S76, judgment is made to find whether the given time interval Tr''' has elapsed and, if not, operation is routed back to S76. If the given time interval Tr''' has elapsed, operation is routed to S78 where judgment is made to find whether the number the number of times in which the discharging takes place has reached the value of X. If the number of times in which the discharging takes place has not reached the value of X, operation is routed back to S66. If the number of times in which the discharging takes place has reached the value of X, the intermittent purging is interrupted, and operation is returned. This allows the fuel cell system to be restored to the normal operating condition.

In the meanwhile, the normal purging to be executed in S40 to S52 is identical in content to that described with reference to the first embodiment and, so, duplicated description is omitted.

With the fifth embodiment set forth above, when compelling anode off-gas to be temporarily discharged from the anode off-gas recirculation unit, control is so executed to allow the flow rates of cathode off-gas and anode off-gas not to be altered and to permit the time interval in which anode off-gas is discharged for one cycle to be shorter than the given discharge rate while compelling anode off-gas to be discontinuously discharged in plural number of times, and there is an advantageous effect in that, by carrying out the discharging of anode off-gas in a divided fashion, an average combustion temperature during the discharging period can be lowered.

Sixth Embodiment

Next, referring to FIG. 14, FIGS. 15A to 15E and FIG. 16, a sixth embodiment of a fuel cell system according to the present invention is described in detail. FIG. 14 is a system structural view illustrating a structure of the sixth embodiment. The sixth embodiment contemplates to further include, in addition to the component elements of the first embodiment shown in FIG. 1, a water supply valve 34 for injecting water to the interior of a mixer 23 of the combustor 7, and a temperature detector 29j that detects the temperature of water to be supplied from a pure water pump 35 to the water supply valve 34. The sixth embodiment is similar in other structure to that of the first embodiment shown in FIG. 1 and, so, like component parts bear the same reference numerals as those of the first embodiment for omitting duplicated description.

In the sixth embodiment, if judgment is made that the calculated combustion temperature exceeds the upper limit value, the pure water is allowed to be supplied from the water supply valve 34 to the combustor 7 at an appropriate flow rate, thereby enabling to suppress an excessive rise in the combustion temperature in a favorable response.

In such operation, the flow rate of water to be supplied to the combustor is calculated in a sequence described below.

Defining the temperature of water to be detected by the temperature detector 29*j* as Tw(K), the enthalpy Hw(KJ/mol) per 1 mol of liquid water is calculated in the following formulae:

$$Water\ (liquid): Hw(Tw) = -3.07835e+02 + 7.25025e-02 \times Tw + 4.38217e-06 \times Tw^2. \quad (20)$$

Defining the flow rate of water to be supplied as Qw(mol/sec), the enthalpy Hsw(Tw) of water to be supplied is given by $$Hsw(Tw) = Hw(Tw) \times Qw(KJ/sec). \quad (21)$$

Therefore, the formulae (12), (13) are rewritten as $$QEh2o'''' = QCh2o + QAh2 + Qw(mol/sec), \quad (12)''''$$

$$HE(Te)'''' = Ho2(Te) \times QEo2 + Hn2(Te) \times QEn2 + Hh2o(Te) \times QEh2o''''(KJ/sec). \quad ((13)'''')$$

From the equation (15), the convergent calculation in respect of the amount Qw of water to be complementally supplied is executed to establish the following formula in case of the combustion temperature Te=the upper limit value Tmax, thereby calculating Qw:

$$HC(Tc) + HA(Ta) + Hw(Tw) = HE(Tmax) + Hb. \quad (22)$$

FIGS. 15A to 15E are flowcharts for illustrating combustion temperature control in the sixth embodiment, with FIG. 15A showing the combustion temperature Te of the combustor 7, FIG. 15B showing the flow rate of water to be supplied from the water supply valve 34 to the combustor 7, FIG. 15C showing the discharge rate of cathode off-gas, FIG. 15D showing the flow rate of hydrogen to be supplied from the hydrogen supply unit 1 and FIG. 15E showing the discharge rate of anode off-gas.

When the predicted combustion temperature Te exceeds the combustion temperature upper limit value Tmax, the pure water is supplied from the water supply valve 34 to the combustor 7 in compliance with the discharge time period Tp in which anode off-gas is discharged. The water supplied to the combustor 7 takes evaporation heat from the circumference as a result of rapid evaporation, resulting in a drop in the combustion temperature of the combustor.

According to this embodiment, there is an advantageous effect in that it becomes possible to avoid a situation where the temperature rises to the combustion temperature, as indicated by a thin solid line in FIG. 15A, exceeding the combustion temperature upper limit value Tmax while enabling to preclude the combustion catalyst of the combustor from being degraded.

FIG. 16 is a flowchart for illustrating a control function of the system controller in the sixth embodiment.

First, in S10, the cell voltage of the fuel cell stack 3 is detected by the voltage detector means 36, and judgment is made to find whether the cell voltage is less than the given value. If the voltage for each unit cell or the voltage for each group of the unit cells detected by the voltage detector means 36 drop below the given value, operation is routed to S12. If these voltages exceed the given value, then operation is routed back to S10, thereby repeatedly executing detection of the cell voltages and judgment thereof. In S12, using the purging operation for achieving recovery of the cell voltage allows prediction for the combustion temperature as a result of anode off-gas being discharged to the combustor 7 for combustion and, thus, the combustion temperature Te is calculated. The predicted value of this combustion temperature Te is calculated, based on the enthalpy calculation for gases flowing into or flowing out from the combustor 7, using the above formulae (1) to (15).

In S14, judgment is made to find whether the combustion temperature Te exceeds the predetermined combustion temperature upper limit value Tmax. In judgment in S14, if the combustion temperature Te does not exceeds the combustion temperature upper limit value Tmax, operation is routed to S40 to carry out normal purging.

In judgment in S14, if it is judged that the combustion temperature Te exceeds the combustion temperature upper limit value Tmax, operations subsequent to S80 are executed to carry out the purging while executing temperature control such that the water is supplied to the combustor 7 to preclude the combustion temperature Te of the combustor 7 from exceeding the combustion temperature upper limit value Tmax.

In S80, operation is executed to calculate the flow rate Qw of water to be supplied from the water supply valve 34 to the combustor 7. During such calculation, as set forth above in terms of the above formulae (20) to (22), the flow rate Qw of water to be supplied can be obtained based on the enthalpy calculation based on the water temperature Tw detected by the temperature detector 29*j*.

In next S82, a purge command is transmitted from the system controller 37 to the water supply valve 34, the anode off-gas discharge valve 27 and the hydrogen supply unit 1. Upon receipt of this purge command, in S23, the air supply unit 2 supplies air to the combustor 7 and, in S84, the supply of water to the combustor 7 from the water supply valve 34 is commenced and, in S86, the anode off-gas discharge valve 27 is opened while, in S88, the hydrogen supply unit 1 increases the flow rate of hydrogen to be supplied to the anode 4.

In subsequent S90, judgment is made to find whether the given time interval Tp has elapsed from the commencement of purging and, if not, operation is routed back to S90. If the given time interval Tp has elapsed from the commencement of purging, operation is routed to S92 to interrupt increasing of the flow rate of hydrogen to be supplied from the hydrogen supply unit 1 and, in S94, the anode off-gas discharge valve 27 is closed while, in S96, interrupting to supply water from the water supply valve 34. This allows the fuel cell system to be returned to the normal operating condition.

In the meanwhile, the normal purging to be executed in S40 to S52 is identical in content to that described with reference to the first embodiment and, so, duplicated description is omitted.

With the sixth embodiment set forth above, when temporarily discharging anode off-gas from the anode off-gas recirculation unit, due to an ability to supply water to the combustor at the appropriate flow rate to suppress an excessive temperature rise in the combustion temperature provides an advantageous effect to enable degradation in performance of the combustor suffered from an excessive thermal load to be suppressed in a favorable response with the least in need for varying the operating condition of the fuel cell stack.

Seventh Embodiment

Next, a seventh embodiment of the present invention is described with reference to FIGS. 18A to 18E and FIGS. 19 to 24. The seventh embodiment has the same structure as that of the first embodiment shown in FIG. 1. With the first embodiment, for the purpose of suppressing the rise in the combustion temperature, the flow rate of air (or the flow rate of cathode off-gas) is rapidly increased concurrent with anode off-gas being discharged. However, when increasing the air flow rate in such a rapid manner, there is a probability wherein fluctuation in pressure take place due to delayed response of an actuator such as a pressure regulator valve that controls the air flow rate. And, depending on the magnitude of the pressure fluctuation, a membrane electrode assembly (MEA) of the fuel cell must have an increased compressive strength, with a resultant probability of increasing costs.

With the above issue in mind, an object of the presently filed embodiment is to provide a fuel cell system that is controlled to allow fluctuation in air pressure to be suppressed to compel a combustion temperature of a combustor not to exceed a given temperature even in a fuel cell with no need for specific compressive strength.

FIGS. 18A to 18E are flowcharts for illustrating combustion temperature control in the seventh embodiment, with FIG. 18A showing the combustion temperature Te of the combustor 7, FIG. 18B showing the flow rate of air supplied from the air supply unit 2, FIG. 18C showing the discharge rate of cathode off-gas, FIG. 18D shows the flow rate of hydrogen to be supplied and FIG. 18E showing the discharge rate of anode off-gas.

As shown in FIGS. 18A to 18E, since the flow rate of hydrogen to be supplied from the hydrogen supply unit 1 is increased by an incremental value equal to that of the discharge rate of anode off-gas concurrent with the commencement of discharging anode off-gas, an output of the fuel cell stack 3 is kept constant during a period prior to and aft from the commencement of discharging anode off-gas.

Further, control is so executed such that when the predicted combustion temperature Te exceeds the combustion temperature upper limit value Tmax, the flow rate of air supplied from the air supply unit 2 is increased to allow the discharge rate of cathode off-gas to increase as shown in FIG. 18C and, therefore, no probability occurs for the combustion temperature of an actual combustor to exceeds the combustion temperature upper limit value Tmax.

By so doing, an advantageous effect results in that no situation takes place where the combustion temperature exceeds the combustion temperature upper limit value Tmax, unlike the related art fuel cell system suffered from an excessive temperature rise as indicated by a thin solid line in FIG. 18A, and the combustion catalyst of the combustor is enabled to be prevented from being degraded.

Also, when increasing the flow rate of air to be supplied from the air supply unit 2, or when decreasing a volume of air that has been increased once, limiting the variation ratio of the air flow rate permits the air flow rate to gradually vary as shown in FIG. 18B.

Thus, there is an advantageous effect in that the fluctuation in the air pressure resulting when increasing the flow rate of air to be supplied from the air supply unit 2 can be suppressed FIG. 19 is a flowchart for illustrating a control function of the system controller in the seventh embodiment.

First, in S100, the cell voltage of the fuel cell stack 3 is detected by the voltage detector means 36, and judgment is made to find whether the cell voltage is less than the given value (voltage threshold). If the voltage for each unit cell or the voltage for each group of the unit cells detected by the voltage detector means 36 drop below the voltage threshold, operation is routed to S12. If these voltages exceed the voltage threshold, then operation is routed back to S100, thereby repeatedly executing detection of the cell voltages and judgment thereof.

Also, the voltage threshold for use in judgment of the cell voltage in S100 is calculated in a manner described below.

Depending on the detected values of the air temperature detectors 29a or 29c, the voltage threshold value is calculated using table data as shown in FIG. 20. This table data is set such that the higher the air temperature, the larger will be the voltage threshold, and thus, as the air temperature increases, operation commences to increase the air flow rate, which will be described below in detail, at an earlier stage. Also, though a detail is described below, since the fluctuation is liable to occur in the air pressure as the air temperature increases, for the purpose of suppressing the pressure fluctuation, operation is executed to minimize the variation rate (absolute value) of the flow rate of air to be increased. By so doing, since a time interval required for increasing the air flow rate is prolonged, increasing the above-described voltage threshold with an increase in the air temperature allows commencing to increase the flow rate of air at an earlier stage, thereby enabling the increase of air to be completed before commencing the discharging of anode off-gas.

Further, depending on the detected value of the air flow meter 32, the voltage threshold for use in judgment of the cell voltage in S100 is calculated using table data as shown in FIG. 21. This table data is set such that the higher the air flow rate, the larger will be the voltage threshold and thus, operation commences to increase the air flow rate at an earlier stage. Also, though a detail is described below, since the fluctuation is liable to occur with an increase in the air flow rate, for the purpose of suppressing the pressure fluctuation, operation is executed to minimize the variation rate (absolute value) of the flow rate of air to be increased. By so doing, since a time interval required for increasing the air flow rate is prolonged, increasing the above-described voltage threshold with an increase in the air flow rate allows increasing of the air flow rate to be commenced at the earlier stage, thereby enabling the increase of air to be completed before commencing the discharging of anode off-gas.

Operational contents of S12 to S16 are identical to those of S12 to S16 shown in FIG. 3 of the first embodiment.

Now, in S102, operation is executed to calculate the variation rate of the flow rate of air to be increased.

Here, the variation rate of the flow rate of air to be increased is calculated in a manner described below.

Depending on the detected value of the air flow meter 32, the variation rate (absolute value) of the flow rate of air to be increased is calculated using table data, as shown in FIG. 23, that is preliminarily stored in the system controller 37. The table data shown in FIG. 23 is table data that allows the variation rate of the air flow rate to be obtained from air flow rate and is set such that the higher the air temperature, the less will be the variation rate (absolute value) of the flow rate of air. As the air temperature increases, since an incremental rate of the amount of saturated steam increases, an air density largely varies in terms of variation in the air temperature. For this reason, in a case where attempt is made to control the air pressure to be maintained at a fixed value, fluctuation in the air density causes remarkable variation in control variables (such as the opening degree of the pressure control valve) and, hence, the air pressure is liable to fluctuate with an increase in the air temperature. Accordingly, the use of table data as shown in FIG. 22 provides an advantageous effect in that the air flow rate can be gradually increased as the air temperature increases with a resultant capability of suppressing the fluctuation in the air pressure during an incremental phase of the air flow rate.

Further, the variation rate (absolute value) of the flow rate of air to be increased is calculated in a manner described below.

Depending on the detected value of the air flow meter 32, operation is executed to calculate the variation rate (absolute value) of the flow rate of air to be increased using table data as shown in FIG. 23. Table data shown in FIG. 24 is an example of table data with the air flow rate being plotted from which the variation rate (absolute value) of the flow rate of air to be increased can be obtained and is set such that the larger the current air flow rate, the smaller will be the variation rate (absolute value) of the air flow rate. If attempt is made to control the air pressure using a butterfly valve so as to control at to be kept at a fixed pressure, the valve opening increases with an increase in the air flow rate, resulting in degraded sensitivity of the air flow rate in terms of the valve opening. For this reason, the larger the air flow rate, the greater will be the variation in the valve opening in terms of the variation in the air flow rate and, therefore, the fluctuation is liable to take place in the air pressure. Consequently, there is an advantageous effect in that through the use of table data shown in FIG. 23, the air flow rate can be gradually increased as the air flow rate increases whereby the fluctuation in the air pressure during an incremental phase of the air flow rate can be suppressed.

Furthermore, the variation rate (absolute value) of the flow rate of air to be increased is calculated to have a value that is greater than that appearing during a decremental phase of the air flow rate subsequent to the incremental phase being terminated. FIG. 24 is an example of table data that is preliminarily stored in the system controller 37 and shows an example in which when obtaining the variation rate of the air flow rate from the air temperature, the variation rate (absolute value) of the flow rate of air during an incremental phase of the air flow rate shown in a solid line is made greater than the variation rate (absolute value) of the air flow rate of air during a decremental phase of the air flow rate as shown in a broken line.

When calculating the variation rate (absolute value) of the air flow rate depending on the air temperatures detected by the air temperature detectors 29a or 29c described above, the variation rate (absolute value) of the flow rate of air to be increased is calculated using table data as shown by the solid line in FIG. 24. As previously described above, when executing pressure control for air using the butterfly valve, the valve opening increase with the increase in the air flow rate, with a resultant decrease in the sensitivity of the air flow rate in terms of the valve opening degree. For this reason, when attempting to perform air pressure control through the use of F/B control, it is probable for a large degree of F/B compensation Variable to be calculated during a period in which the air flow rate is increasing. In case of using general PI control, an I control variable (integral control variable) takes a large value.

Under such a condition, if attempt is made to rapidly decrease the air flow rate, a probability occurs where the control variable temporarily takes an improper value due to this F/B compensation variable, tending to cause fluctuation in the air pressure. Accordingly, an advantageous effect resides in that upon using table data shown by the broken line in FIG. 24, it becomes possible for the variation rate (absolute value) of the air flow rate during the decremental phase subsequent to the incremental phase being terminated, to be calculated to have a value smaller than the variation rate (absolute value) of the flow rate of air during the incremental phase of the air flow rate whereby the fluctuation in the air pressure can be suppressed not only when increasing the air flow rate but also when decreasing the air flow rate subsequent to the incremental phase.

In next S104, the air supply unit 2 commences to increase the flow rate of air to be supplied to the cathode 5. Here, depending on the variation rate calculated in S102, operation is carried out to increase the air flow rate.

In S106, judgment is made to find whether increasing the air flow rate has been completed. This judgment is conducted based on the detected value of the air flow rate and in case of judgment that the incremental operation has been completed, operation is routed to S18.

In S18, a purge command is transmitted from the system controller 37 to the anode off-gas discharge valve 27 and the hydrogen supply unit 1. Upon receipt of this purge command, in S24, the anode off-gas discharge valve 27 is opened while, in S26, the hydrogen supply unit 1 increases the flow rate of hydrogen to be supplied to the anode 4.

In subsequent S28, judgment is made to find whether the given time interval Tp has elapsed from the commencement of purging and, if not, operation is routed back to S28. If the given time interval Tp has elapsed from the commencement of purging, operation is routed to S30. In S30, operation is executed to interrupt increasing the flow rate of hydrogen to be supplied from the hydrogen supply unit 1 and, in S32, the anode off-gas discharge valve 27 is closed.

In consecutive S108, operation is executed to calculate the variation rate in the flow rate of air to be decreased.

Here, depending on the detected values of the air temperature detectors 29a or 29c, the variation rate (absolute value) of the flow rate of air to be decreased is calculated using table data as shown in FIG. 22. This table data is determined such that as set forth above, the higher the temperature of air, the smaller will be the variation rate (absolute value) of the air flow rate, and has an advantageous effect in that the air flow rate can be gradually decreased as the air temperature increases and the fluctuation in the air pressure during the decremental phase can be suppressed.

Further, depending on the detected value of the air flow detectors 32, the variation rate (absolute value) of the flow rate of air to be decreased is calculated using table data as shown in FIG. 23. This table data is set such that, as set forth above, the larger the current air flow rate, the smaller will be the variation rate (absolute value) of the air flow rate, and has an advantageous effect in that it becomes possible to gradually decrease the air flow rate as the air flow rate increases and the fluctuation in the air pressure during the decremental phase can be suppressed.

Moreover, the variation rate (absolute value) of the flow rate of air during the decremental phase is calculated to have a value less than the variation rate (absolute value) of the air flow rate during the incremental phase. An advantageous effect resides in that calculation of the variation rate (absolute value) of the air flow rate during the decremental phase depending on table data as shown by the broken line in FIG. 24 allows the fluctuation in the air flow rate to be suppressed in a manner as set forth above not only when increasing the air flow rate but also when decreasing the air flow rate subsequent to the incremental phase.

In succeeding S110, the air supply unit 2 commences to decrease the flow rate of air to be supplied to the cathode 5. Here, depending on the variation rate calculated in S108, the air flow rate is decreased, and the air flow rate is restored to the original condition. This allows the fuel cell system to be returned to the normal operating condition.

S40 to S52 are identical to S40 to S52 of the first embodiment shown in FIG. 3.

Also, while in the first to seventh embodiments, when predicting the combustion temperature Te, the combustion temperature is predicted through the enthalpy calculation of gases flowing into or flowing from the combustor, the combustion temperature map plotted in terms of the operating condition (here, the flow rate of cathode off-gas and relative humidity) of the fuel cell shown in FIG. 17 may be employed.

That is, measured data for the combustion temperatures for respective operating conditions in a prototype fuel cell is gathered, and through the use of this data, the map for the combustion temperatures related to the operating conditions is prepared. And, the map is stored in the system controller 37 for use in prediction of the combustion temperature. In this case, the numbers of static steps and dynamic steps of a system controller program can be remarkably reduced, thereby enabling system control to be achieved in a relatively simplified manner.

However, when predicting the combustion temperature using the map, since a probability takes place where a prediction accuracy of the combustion temperature is degraded due to adverse affects such as an error in control of the flow rate of the system and an atmospheric temperature, it is desirable to set the upper limit value Tmax to a lower level than that when the combustion temperature is obtained based on the enthalpy.

INDUSTRIAL APPLICABILITY

With the present invention described above, by controlling the temperature of combustion gas resulting in the combustor in a way not to exceed the given temperature when discharging anode off-gas by the purging unit, there is an advantageous effect in that degradation in performance of the combustor due to an excessive thermal load can be suppressed.

The entire content of Japanese Patent Applications No. P2002-329978 with a filing data of Nov. 13, 2002 and No. 2003-296773 with a filling date of Aug. 20, 2003 are herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

The invention claimed is:

1. A fuel cell system comprising:
a fuel gas supply unit supplying fuel gas;
an oxidant gas supply unit supplying oxidant gas;
a fuel cell stack generating electric power using the fuel gas and the oxidant gas;
an anode off-gas recirculation unit directly recirculating anode off-gas, discharged from an anode of the fuel cell stack, to the anode;
a purging unit temporarily discharging the anode off-gas from the anode off-gas recirculation unit to an outside thereof;
a combustor combusting at least the anode off-gas, discharged from the purging unit, and the oxidant gas or cathode off-gas discharged from a cathode of the fuel cell stack; and
a system controller operative to permit the purging unit to discharge the anode off-gas to the combustor, such that a combustion temperature of the combustor is equal to or less than a given temperature.

2. The fuel cell system according to claim 1, wherein the system controller is operative to predict at least one of a flow rate and a composition of mixed gas, flowing into the combustor, based on an operating load of the fuel cell stack for providing a predicted result and to predict the combustion temperature of the combustor based on the predicted result such that when a predicted combustion temperature is judged to exceed the given temperature, the system control is executed so as to preclude the combustion temperature from exceeding the given temperature.

3. The fuel cell system according to claim 2, wherein system controller is operative to perform control such that if the predicted combustion temperature is judged to exceed the given temperature when temporarily discharging the anode off-gas from the anode off-gas recirculation unit, a flow rate of the oxidant gas to be supplied from the oxidant gas supply unit is increased such that flow rates of the oxidant gas or the cathode off-gas to be supplied to the combustor are increased.

4. The fuel cell system according to claim 2, further comprising an auxiliary oxidant gas supply unit supplying auxiliary oxidant gas to the combustor;
wherein the system controller is operative to perform control such that if the predicted combustion temperature is judged to exceed the given temperature when temporarily discharging the anode off-gas from the anode off-gas recirculation unit, the auxiliary oxidant gas is additionally supplied to the combustor from the auxiliary oxidant gas supply unit.

5. The fuel cell system according to claim 2, wherein the system controller is operative to perform control such that if the predicted combustion temperature is judged to exceed the given temperature when temporarily discharging the anode off-gas from the anode off-gas recirculation unit, an anode off-gas flow rate is set to be less than a predetermined discharge flow rate and an anode off-gas discharge time interval is increased.

6. The fuel cell system according to claim 2, wherein the system controller is operative to perform control such that if the predicted combustion temperature is judged to exceed the given temperature when temporarily discharging the anode off-gas from the anode off-gas recirculation unit, a cathode off-gas flow rate and an anode off-gas discharge flow rate are maintained whereas an anode off-gas discharge time interval for one cycle is set to be shorter than a predetermined discharge time interval and the anode off-gas is discontinuously discharged a plurality of times.

7. The fuel cell system according to claim 2, wherein the system controller is operative to perform control such that if the predicted combustion temperature is judged to exceed the given temperature when temporarily discharging the anode off-gas from the anode off-gas recirculation unit, water is supplied to the combustor at a given flow rate.

8. The fuel cell system according to claim 3, wherein the system controller is operative to predict the combustion temperature through an enthalpy calculation of gases flowing into or flowing out from the combustor.

9. The fuel cell system according to claim 3, wherein the system controller is operative to preliminarily store a map of combustion temperatures in terms of a cathode off-gas discharge rate condition that is experimentally obtained in advance and to predict the combustion temperature referring to the map of the combustion temperatures.

10. The fuel cell system according to claim 1, wherein the system controller is operative to commence increasing flow rates of the oxidant gas or the cathode off-gas to be supplied to the combustor from the oxidant supply unit, prior to permitting the purging unit to commence discharging of the anode off-gas, for limiting a variation rate of the flow rates.

11. The fuel cell system according to claim 1, wherein the system controller is operative to commence decreasing flow rates of the oxidant gas or the cathode off-gas to be supplied to the combustor from the oxidant supply unit, subsequent to discharging of the anode off-gas being terminated, for limiting a variation rate of the flow rates.

12. The fuel cell system according to claim 1, wherein the system controller is operative to limit a variation rate of flow rates of the oxidant gas or the cathode off-gas to be supplied to the combustor from the oxidant supply unit such that absolute values in variation rates of the oxidant gas, to be supplied from the oxidant gas supply unit to the combustor, or the cathode off-gas decrease as temperatures of the oxidant gas or the cathode off-gas increase.

13. The fuel cell system according to claim 1, wherein the system controller is operative to advance a timing at which flow rates of the oxidant gas, to be supplied to the combustor from the oxidant supply unit, or the cathode off-gas are commenced to be increased as temperatures of the oxidant gas or the cathode off-gas increase.

14. The fuel cell system according to claim 1, wherein the system controller is operative to limit variation rates in flow rates of the oxidant gas, to be supplied to the combustor from the oxidant supply unit, or the cathode off-gas such that an absolute value of the variation rate decreases as flow rates of the oxidant gas or the cathode off-gas increase.

15. The fuel cell system according to claim 1, wherein the system controller is operative to advance a timing at which flow rates of the oxidant gas, to be supplied to the combustor from the oxidant supply unit, or the cathode off-gas are commenced to be increased as flow rates of the oxidant gas or the cathode off-gas increase.

16. The fuel cell system according to claim 1, further comprising an oxidant gas pressure control unit controlling pressures of the oxidant gas or the cathode off-gas;
wherein the system controller is operative to control the oxidant gas pressure control unit such that absolute values in variation rates of flow rates of the oxidant gas or the cathode off-gas, to be supplied to the combustor, during a decremental phase of the flow rates subsequent to an incremental phase of the flow rates of the oxidant gas or the cathode off-gas to be supplied to the combustor are made less than absolute values in the variation rates of the flow rates of the oxidant gas or the cathode off-gas to be supplied during the incremental phase.

17. A fuel cell system comprising:
fuel gas supply means for supplying fuel gas;
oxidant gas supply means for supplying oxidant gas;
a fuel cell stack generating electric power using the fuel gas and the oxidant gas;
anode off-gas recirculation means for directly recirculating anode off-gas, discharged from an anode of the fuel cell stack, to the anode;
purging means for temporarily discharging the anode off-gas from the anode off-gas recirculation means to an outside thereof;
a combustor combusting at least the anode off-gas, discharged from the purging means, and the oxidant gas or cathode off-gas discharged from a cathode of the fuel cell stack; and system control means for operatively permitting the purging means to discharge the anode off-gas to the combustor, such that a combustion temperature of the combustor is equal to or less than a given temperature.

18. A method of controlling a fuel cell system, comprising:
preparing a fuel gas supply unit supplying fuel gas, an oxidant gas supply unit supplying oxidant gas, a fuel cell stack generating electric power using the fuel gas and the oxidant gas, a combustor combusting at least anode off-gas, discharged from an anode of the fuel cell stack, and the oxidant gas or cathode off-gas, discharged from a cathode of the fuel cell stack;
discharging anode off-gas from the anode of the fuel cell stack;
directly recirculating the anode off-gas, discharged from the anode of the fuel cell stack, to the anode;
combusting at least the anode off-gas, discharged from the anode of the fuel cell stack, and the oxidant gas or cathode off-gas discharged from the cathode of the fuel cell stack; and
permitting the anode off-gas to be discharged to the combustor, such that a combustion temperature of the combustor is equal to or less than a given temperature.

19. The fuel cell system according to claim 1, wherein the system controller is operative to permit the purging unit to discharge the anode off-gas to the combustor at a given rate and to permit the fuel gas supply unit to increase a hydrogen flow rate to be at substantially the same flow rate, such that the combustion temperature of the combustor is equal to or less than the given temperature.

20. The fuel cell system according to claim 17, wherein the system control means is operative to permit the purging means to discharge the anode off-gas to the combustor at a given rate and to permit the fuel gas supply means to increase a hydrogen flow rate to be at substantially the same flow rate, such that the combustion temperature of the combustor is equal to or less than the given temperature.

21. The method of controlling the fuel cell system according to claim 18, wherein the step of permitting the anode off-gas to be discharged to the combustor comprises the step of discharging the anode off-gas to the combustor at a given flow rate and increasing a hydrogen flow rate to be at substantially the same flow rate, such that the combustion temperature of the combustor is equal to or less than the given temperature.

* * * * *